US011153838B1

United States Patent
Thota

(10) Patent No.: US 11,153,838 B1
(45) Date of Patent: Oct. 19, 2021

(54) TIME SYNCHRONIZATION ENHANCEMENTS FOR INTEGRATED 5G-TSN NETWORKING

(71) Applicant: Kabushiki Kaisha Toshiba, Minato-ku (JP)

(72) Inventor: Jayashree Thota, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/942,324

(22) Filed: Jul. 29, 2020

(51) Int. Cl.
*H04W 56/00* (2009.01)
*H04L 12/26* (2006.01)

(52) U.S. Cl.
CPC ..... *H04W 56/0045* (2013.01); *H04L 43/0864* (2013.01); *H04W 56/0005* (2013.01); *H04W 56/0015* (2013.01)

(58) Field of Classification Search
None
See application file for complete search history.

(56) References Cited

U.S. PATENT DOCUMENTS

| 2008/0151771 | A1* | 6/2008 | Dowse | H04L 43/0858 370/252 |
| 2016/0170439 | A1* | 6/2016 | Aweya | G06F 1/10 713/401 |
| 2021/0058181 | A1* | 2/2021 | Dwivedi | H04J 3/0667 |

OTHER PUBLICATIONS

"3rd Generation Partnership Project; Technical Specification Group Services and System Aspects; Study on Communication for Automation in Vertical Domains (Release 16)", 3GPP TR 22.804 V16.2.0 (Dec. 2018), 2018, 196 pages.

(Continued)

*Primary Examiner* — Anh Ngoc M Nguyen
(74) *Attorney, Agent, or Firm* — Oblon, McClelland, Maier & Neustadt, L.L.P.

(57) ABSTRACT

A computer-implemented method for determining time synchronisation parameters of a communication apparatus in a wireless network. The method comprising transmitting an uplink message at a first time, the first time being the start of a time period ($T_{period}$) and receiving at least one downlink message, each downlink message being associated with a first round trip delay ($T_{roundAi}$), a second round trip delay ($T_{roundB(n+1-i)}$), a first reply time ($T_{replyA(n+1-i)}$) and a second reply time ($T_{replyB1}$). The method further comprising determining a first difference between the first round trip delay ($T_{roundAi}$) and the first reply time ($T_{replyA(n+1-i)}$); determining a second difference between the second round trip time ($T_{roundB(n+1-i)}$) and the second reply time ($T_{replyB1}$); and calculating an estimated propagation delay ($\widehat{T_p^i}$) based on the sum of the first difference ($T_{roundAi}-T_{replyA(n+1-i)}$) and the second difference ($T_{roundB(n+1-i)}-T_{replyBi}$).

20 Claims, 9 Drawing Sheets

(56) References Cited

OTHER PUBLICATIONS

Aamir Mahmood, et al., "Time Synchronization in 5G Wireless Edge: Requirements and Solutions for Critical MTC", IEEE Communications Magazine, Dec. 2019, 7 pages.

Chenyu Zhang, et al., "TAP: A High-Precision Network Timing Method Over Air Interface Based on Physical-Layer Signals", IEEE Access, vol. 7, 2019, 11 pages.

Aamir Mahmood, et al., "Over-the-Air Time Synchronization for URLLC: Requirements, Challenges and Possible Enablers," 2018 15th International Symposium on Wireless Communication Systems (ISWCS), 2018, 6 pages.

Pekka Kyösti, et al., "IST-4-027756 WINNER II D1.1.2 v1.2 WINNER II Channel Models", Information Society Technologies 11, 2008, 82 pages.

* cited by examiner

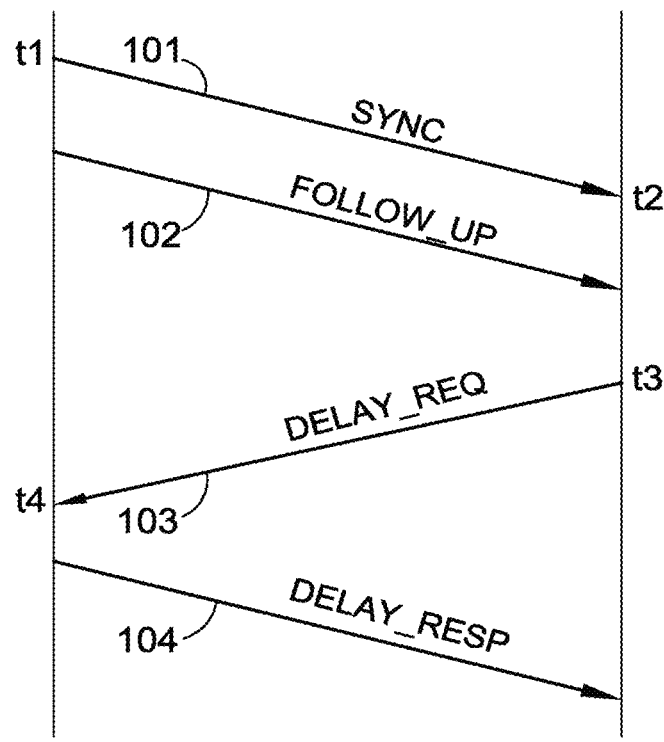
Fig.1 <Prior art>
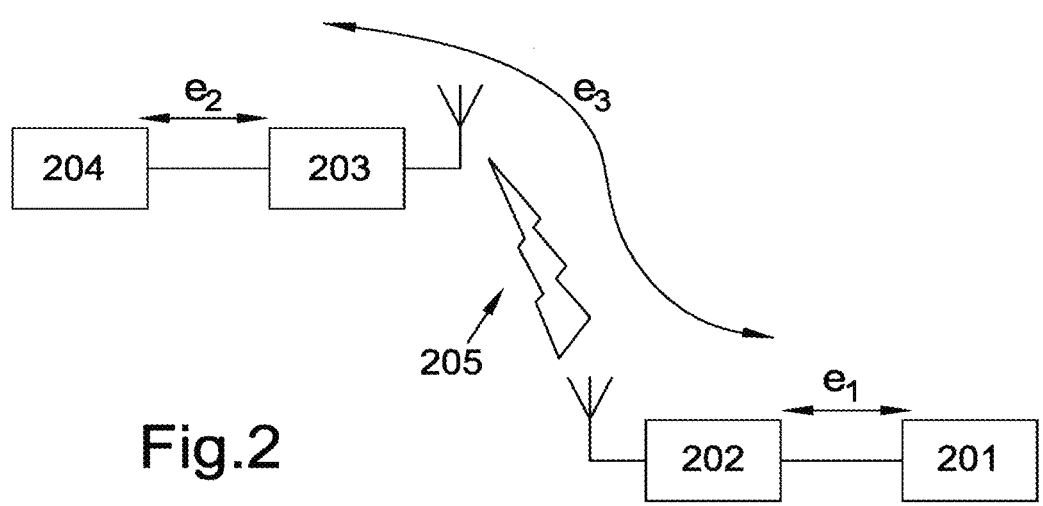
Fig.2

US 11,153,838 B1

TIME SYNCHRONIZATION ENHANCEMENTS FOR INTEGRATED 5G-TSN NETWORKING

FIELD

Embodiments described herein relate generally to a method and device for determining time synchronisation parameters of a communication apparatus in a wireless network.

BACKGROUND

Industry 4.0 refers to a new phase in the industrial revolution that focuses on interconnectivity, automation, machine learning, and real-time data. Factories-of-the-Future (FoF) embody Industry 4.0 and help manufacturers to increase levels of automation, improve monitoring, enable self-diagnosis and facilitate new levels of analysis.

In the past, industrial control systems have often used wired networks to exchange data. This approach typically involves considerable costs, both for installation and on-going maintenance. To this end, wireless communication technologies have been suggested as an alternative. Unlike wired communication networks, wireless networks typically have lower installation and maintenance costs, and provide increased flexibility in where the network nodes are deployed. Cellular wireless technologies like 5G New Radio (NR) are seen as a possible wireless communication protocol for use in the Factories-of-the-Future (FOF).

Many applications in the Factories-of-the-Future (FoF) rely on synchronized real-time coordination amongst multiple devices (e.g. belt conveyers, assemblers, picking, welding) in order to ensure correct execution of tasks. In order to achieve this, the nodes in the network must be synchronized in time with little or no error.

IEEE Time-Sensitive Network (TSN) over wireless 5G New Radio (NR), also referred to as Time-Sensitive Communication (TSC), is a key enabler for industrial automation using wireless networks. Time Sensitive Communication (TSC) requires a time synchronization requirement (i.e. a maximum difference between the time at two TSN nodes after synchronization) of 1 µs for a service area of up to 100 m². However, current approaches to time synchronization do not achieve this requirement. For this reason a new approach to time synchronisation in wireless networks, in particular in 5G New Radio (NR) wireless networks, is required.

Arrangements of the embodiments will be understood and appreciated more fully from the following detailed description, made by way of example only and taken in conjunction with drawings in which:

FIG. 1 shows a prior art version of Precision Time Protocol (PTP);

FIG. 2 shows two time sensitive networks connected via a wireless interface according to an embodiment;

DETAILED DESCRIPTION

Figure 3:
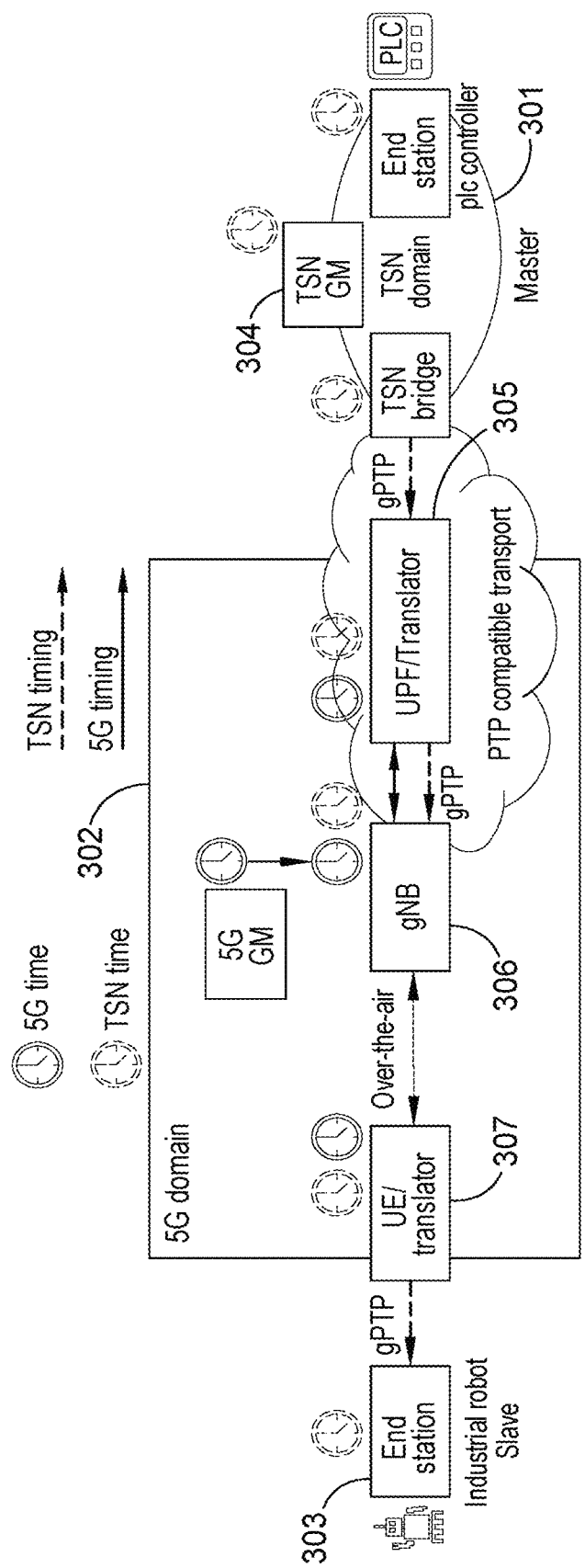
FIG. 3 shows a 5G wireless network connecting two time-sensitive networks according to an embodiment.

According to a first aspect there is provided a computer-implemented method for determining time synchronisation parameters of a communication apparatus in a wireless network. The method comprising: transmitting an uplink message at a first time, the first time being the start of a time period ($T_{period}$) and receiving at least one downlink message. Wherein each downlink message being associated with a first round trip delay ($T_{roundAi}$), a second round trip delay ($T_{roundB(n+1-i)}$), a first reply time ($T_{replyA(n+1-i)}$) and a second reply time ($T_{replyB1}$). Wherein the first round trip delay ($T_{roundAi}$) equals a time difference between transmitting the uplink message and receiving a downlink message; the first reply time ($T_{replyA(n+1-i)}$) equals a difference between the time period ($T_{period}$) and the first round trip delay ($T_{roundAi}$); the second reply time ($T_{replyB1}$) equals a time difference between a second communication apparatus receiving the uplink message and transmitting the downlink message; and the second round trip time ($T_{rounds(n+1-i)}$) equals a difference between the time period ($T_{period}$) and the second reply time ($T_{replyB1}$). The method further comprising determining a first difference between the first round trip delay ($T_{roundAi}$) and the first reply time ($T_{replyA(n+1-i)}$), determining a second difference between the second round trip time ($T_{roundB(n+1-i)}$) and the second reply time ($T_{replyB1}$); and calculating an estimated propagation delay ($\widehat{T_p}^i$) based on the sum of the first difference ($T_{roundAi} - T_{replyA(n+1-i)}$) and the second difference ($T_{roundB(n+1-i)} - T_{replyBi}$).

In an embodiment calculating the estimated propagation delay further comprises dividing the sum of the first difference and the second difference by four.

In an embodiment the at least one downlink message comprises a first downlink message and a second downlink message, and wherein calculating an estimated propagation delay comprises: averaging: the sum of the first difference and the second difference associated with the first downlink message; and the sum of the first difference and the second difference associated with the second downlink message.

In an embodiment the plurality of downlink messages comprises a first downlink message and a second downlink message, and the method further comprises: receiving a second reply time associated with the first downlink message ($T_{replyB1}$) from the second communication apparatus in the first downlink message; and receiving a second reply time associated with the second downlink message ($T_{replyB2}$) from the second communication apparatus in the second downlink message.

In an embodiment the first downlink message comprises a time of transmission and the method further comprises determining a propagation delay based on the time different between the time of transmission and a time of receipt of the first downlink message, and calculating the second reply time associated with the first downlink message ($T_{replyB1}$) by subtracting double the propagation time from the first round trip delay ($T_{roundAi}$).

In an embodiment the method further comprises receiving a second reply time associated with the first downlink message ($T_{replyB1}$) from the second communication apparatus; and calculating a second reply time associated with the second downlink message ($T_{replyB2}$) based on the second reply time associated with the first downlink message ($T_{replyB1}$).

In an embodiment a duration of time between the second communication apparatus transmitting the first downlink message and the second communication apparatus transmitting the second downlink message equals a first delay ($T_{SIB}$), the method further comprising calculating the second reply time associated with the second downlink message ($T_{replyB2}$) comprises adding the first delay ($T_{SIB}$) to the second reply time associated with the first downlink message ($T_{replyB1}$).

In an embodiment the method further comprises measuring a time delay (×) between receiving the first downlink message and receiving the second downlink message; determining an offset ($SIB_{offset}$) based on the time delay (Δ); and calculating a first round trip time associated with the second downlink message ($T_{roundA2}$) by summing the time offset ($SIB_{offset}$), the first delay ($T_{SIB}$) and a first round trip time associated with the first downlink message ($T_{roundA1}$).

In an embodiment the method further comprises determining the first round trip time associated with the first downlink message ($T_{roundA1}$) by measuring a time difference between transmitting the first uplink message and receiving the first downlink message.

In an embodiment the method further comprises determining an error in the estimated propagation delay ($\widetilde{e_p}^i$) according to a difference between the estimated propagation delay ($\widetilde{T_p}^i$) and a propagation delay derived from a Timing Advance (TA).

In an embodiment the method further comprises calculating the propagation delay derived from the Timing Advance (TA) by: receiving the Timing Advance (TA), concerting the Timing Advance (TA) to a round trip delay time, and calculating the propagation delay derived from the Timing Advance (TA) by dividing the round trip delay time by two.

According to a second aspect there is provided a computer-implemented method for determining time synchronisation parameters of a communication apparatus in a wireless network. The method comprising performing at least one iteration, each iteration comprising: determining an estimated propagation delay (($\widetilde{T_p}^n)^k$; τ) for a communication link between the communication apparatus and a second apparatus; transmitting an uplink message at a first time ($\widetilde{T_{ijk}}$); receiving a response to the uplink message at a second time ($\widetilde{R_{ijk}}$); determining a third time ($\widetilde{R_{jik}}$) based on the sum of the first time ($\widetilde{T_{ijk}}$) and the estimated propagation delay (($\widetilde{T_p}^n)^k$; τ); determining a fourth time ($\widetilde{T_{ijk}}$) indicating a time of transmission of the response to the uplink message; and determining a clock skew ($\omega^\sim$) and a clock offset ($\phi^\sim$) for the communication apparatus, and a propagation delay for the communication link ($\tau^\sim$) based on the first time ($\widetilde{T_{ijk}}$), the second time ($\widetilde{R_{ijk}}$), the third time ($\widetilde{R_{jik}}$), and the fourth time ($\widetilde{T_{ijk}}$).

In an embodiment determining the clock skew ($\omega^\sim$) and the clock offset ($\phi^\sim$) for the communication apparatus, and the propagation delay for the communication link ($\tau^\sim$) comprises: forming a first matrix (A) comprising the first time ($\widetilde{T_{ijk}}$) and the second time ($\widetilde{R_{ijk}}$); forming a second matrix (b) comprising the third time ($\widetilde{R_{jik}}$) and the fourth time ($\widetilde{T_{ijk}}$); forming a third matrix (θ) comprising a plurality of synchronization parameters (α; β) and the propagation delay for the communication link ($\tau^\sim$); and solving $\theta = bA^{-1}$. In an embodiment, solving comprises determining a value for the third matrix (θ) that equals the second matrix (b) multiplied by an inverse of the first matrix ($A^{-1}$).

In an embodiment solving $\theta = bA^{-1}$ comprising using the Least Squares (LS) method.

In an embodiment the at least one iteration equals four iterations.

In an embodiment determining the fourth time ($\widetilde{T_{ijk}}$) comprises receiving the fourth time ($\widetilde{T_{ijk}}$) in the response to the uplink message.

In an embodiment, the method further comprises: updating a local time reference of the communication apparatus using the calculated propagation delay ($\tau^\sim$), the calculated clock offset ($\phi^\sim$), and the calculated clock skew ($\omega^\sim$).

In an embodiment the first time is the start of a time period ($T_{period}$); and determining the estimated propagation delay (($\widetilde{T_p}^n)^k$) comprises: receiving at least one downlink message, each downlink message being associated with a first round trip delay ($T_{roundAi}$), a second round trip delay ($T_{roundB(n+1-i)}$), a first reply time ($T_{replyA(n+1-i)}$) and a second reply time ($T_{replyB1}$) Wherein: the first round trip delay ($T_{roundAi}$) equals a time difference between transmitting the uplink message and receiving a downlink message; the first reply time ($T_{replyA(n+1-i)}$) equals a difference between the time period ($T_{period}$) and the first round trip delay ($T_{roudAi}$); the second reply time ($T_{replyB1}$) equals a time difference between a second communication apparatus receiving the uplink message and transmitting the downlink message; and the second round trip time ($T_{roundB(n+1-i)}$) equals a difference between the time period ($T_{period}$) and the second reply time ($T_{replyB1}$). The method further comprising determining a first difference between the first round trip delay ($T_{roundAi}$) and the first reply time ($T_{replyA(n+1-i)}$); determining a second difference between the second round trip time ($T_{roundB(n+1-i)}$) and the second reply time ($T_{replyB1}$); and calculating the estimated propagation delay ($\widetilde{T_p}^i$) based on the sum of the first difference ($T_{roundAi} - T_{replyA(n+1-i)}$) and the second difference ($T_{roundB(n+1-i)} - T_{replyBi}$).

In an embodiment the estimated propagation delay (τ) is determined based on a Timing Advance (TA) value.

According to a third aspect, there is provided a computer-implemented method for determining time synchronisation parameters of a communication apparatus in a wireless network. The method comprising: receiving a Timing Advance (TA) from a second communication apparatus; determining a first propagation delay (τ) from the Timing Advance (TA); determining an error ($e_{total}$) in the first propagation delay (τ); comparing the error ($e_{total}$) with a predetermined threshold; and in response to determining that the error ($e_{total}$) is greater than the predetermined threshold: determining a propagation delay ($\tilde{\tau}$) using the method of claim 9; and updating a local time reference of the communication apparatus using the propagation delay ($\tilde{\tau}$).

In an embodiment the method further comprises: calculating a clock skew ($\tilde{\omega}$) and a clock offset ($\tilde{\phi}$) for the communication apparatus; and updating the local time reference of the communication apparatus using the clock skew ($\tilde{\omega}$) and a clock offset ($\tilde{\phi}$).

According to a fourth aspect, there is provided a computer-implemented method for determining time synchronisation parameters of a communication apparatus in a wireless network. The method comprising: receiving a Timing Advance (TA) from a second communication apparatus; determining a first propagation delay ($\tau$) from the Timing Advance (TA); determining an error ($e_{total}$) in the first propagation delay ($\tau$); comparing the error ($e_{total}$) with a predetermined threshold; and in response to determining that the error ($e_{total}$) is greater than the predetermined threshold: calculating an estimated propagation delay ($\widehat{T_p}^i$) using the method of claim 1; and updating a local time reference of the communication apparatus using the propagation delay ($\widehat{T_p}^i$).

In an embodiment the method further comprises: calculating an error in the estimated propagation delay ($\widehat{e_p}^i$) according to a difference between the estimated propagation delay ($\widehat{T_p}^i$) and the propagation delay ($\tau$); and updating the local time reference of the communication apparatus using the error in the estimated propagation delay ($\widehat{e_p}^i$).

According to a fifth aspect there is provided a device for determining time synchronisation parameters of a communication apparatus in a wireless network, the device being configured to: receive a Timing Advance (TA) from a second communication apparatus; determine a first propagation delay ($\tau$) from the Timing Advance (TA); determine an error ($e_{total}$) in the first propagation delay ($\tau$); compare the error ($e_{total}$) with a predetermined threshold; and in response to determining that the error ($e_{total}$) is greater than the predetermined threshold: determine a propagation delay ($\tilde{\tau}$) using the method of claim 1 and/or claim 9; and update a local time reference of the communication apparatus using the propagation delay ($\tilde{\tau}$).

In an embodiment the device is further configured to: calculate a clock skew ($\tilde{\omega}$) and a clock offset ($\tilde{\phi}$) for the communication apparatus; and update the local time reference of the communication apparatus using the clock skew ($\tilde{\omega}$) and a clock offset ($\tilde{\phi}$).

According to a sixth aspect there is provided a device for determining time synchronisation parameters of a communication apparatus in a wireless network, the device being configured to: receive a Timing Advance (TA) from a second communication apparatus; determine a first propagation delay ($\tau$) from the Timing Advance (TA); determine an error ($e_{total}$) in the first propagation delay ($\tau$); compare the error ($e_{total}$) with a predetermined threshold; and in response to determining that the error ($e_{total}$) is greater than the predetermined threshold: calculate an estimated propagation delay ($\widehat{T_p}^i$) using the method of claim 1 and/or claim 9; and update a local time reference of the communication apparatus using the estimated propagation delay ($\widehat{T_p}^i$).

In an embodiment the device is further configured to calculate an error in the estimated propagation delay ($\widehat{e_p}^i$) according to a difference between the estimated propagation delay ($\widehat{T_p}^i$) and the propagation delay ($\tau$); and update the local time reference of the communication apparatus using the error in the estimated propagation delay ($\widehat{e_p}^i$).

According to a seventh aspect there is provided a device for determining time synchronisation parameters of a communication apparatus in a wireless network. The apparatus being configured to transmit an uplink message at a first time, the first time being the start of a time period ($T_{period}$); receive at least one downlink message, each downlink message being associated with a first round trip delay ($T_{roundAi}$), a second round trip delay ($T_{roundB(n+1-i)}$); a first reply time ($T_{replyA(n+1-i)}$) and a second reply time ($T_{replyB1}$). Wherein the first round trip delay ($T_{roundAi}$) equals a time difference between transmitting the uplink message and receiving a downlink message; the first reply time ($T_{replyA(n+1-i)}$) equals a difference between the time period ($T_{period}$) and the first round trip delay ($T_{roundAi}$); the second reply time ($T_{replyB1}$) equals a time difference between a second communication apparatus receiving the uplink message and transmitting the downlink message; and the second round trip time ($T_{roundB(n+1-i)}$) equals a difference between the time period ($T_{period}$) and the second reply time ($T_{replyB1}$) The device being further configured to: determine a first difference between the first round trip delay ($T_{roundAi}$) and the first reply time ($T_{replyA(n+1-i)}$); determine a second difference between the second round trip time ($T_{roundB(n+1-i)}$) and the second reply time ($T_{replyB1}$); and calculate an estimated propagation delay ($\widehat{T_p}^i$) based on the sum of the first difference ($T_{roundAi} - T_{replyA(n+1-i)}$) and the second difference ($T_{roundB(n+1-i)} - T_{replyBi}$).

In an embodiment, calculating the estimated propagation delay further comprises dividing the sum of the first difference and the second difference by four.

In an embodiment the at least one downlink message comprises a first downlink message and a second downlink message, and wherein calculating an estimated propagation delay comprises: averaging: the sum of the first difference and the second difference associated with the first downlink message; and the sum of the first difference and the second difference associated with the second downlink message.

In an embodiment device is further configured to: receive a second reply time associated with the first downlink message ($T_{replyB1}$) from the second communication apparatus; and calculate a second reply time associated with the second downlink message ($T_{replyB2}$) based on the second reply time associated with the first downlink message ($T_{replyB1}$).

In an embodiment a duration of time between the second communication apparatus transmitting the first downlink message and the second communication apparatus transmitting the second downlink message equals a first delay ($T_{SIB}$), and wherein calculating the second reply time associated with the second downlink message ($T_{replyB2}$) comprises adding the first delay ($T_{SIB}$) to the second reply time associated with the first downlink message ($T_{replyB1}$).

In an embodiment the device is further configured to: measure a time delay (A) between receiving the first downlink message and receiving the second downlink message; determine an offset ($SIB_{offset}$) based on the time delay (a); and calculate a first round trip time associated with the second downlink message ($T_{roundA2}$) by summing the time offset ($SIB_{offset}$), the first delay ($T_{SIB}$) and a first round trip time associated with the first downlink message ($T_{roundA1}$).

In an embodiment the device is further configured to: determine the first round trip time associated with the first downlink message ($T_{roundA1}$) by measuring a time difference between transmitting the first uplink message and receiving the first downlink message.

In an embodiment the device is further configured to: determine an error in the estimated propagation delay ($\widehat{e_p}^i$) according to a difference between the estimated propagation delay ($\widehat{T_p}^i$) and a propagation delay derived from a Timing Advance (TA).

According to an eighth aspect there is provided a device for determining time synchronisation parameters of a communication apparatus in a wireless network, the device being configured to perform at least one iteration. Each iteration comprising: determining an estimated propagation delay (($\widehat{T_p}^n)^k$; τ) for a communication link between the communication apparatus and a second apparatus; transmitting an uplink message at a first time ($\widetilde{T_{ijk}}$); receiving a response to the uplink message at a second time ($\widetilde{R_{ijk}}$); determining a third time ($\widetilde{R_{jik}}$) based on the sum of the first time ($\widetilde{T_{ijk}}$) and the estimated propagation delay (($\widehat{T_p}^n)^k$; τ); determining a fourth time ($\widetilde{T_{ijk}}$) indicating a time of transmission of the response to the uplink message; and determining a clock skew (ω˜) and a clock offset (φ˜) for the communication apparatus, and a propagation delay for the communication link (τ˜) based on the first time ($\widetilde{T_{ijk}}$), the second time ($\widetilde{R_{ijk}}$), the third time ($\widetilde{R_{jik}}$), and the fourth time ($\widetilde{T_{ijk}}$).

In an embodiment, when determining the clock skew (ω˜) and the clock offset (φ˜) for the communication apparatus, and the propagation delay for the communication link (τ˜), the device is configured to: form a first matrix (A) comprising the first time ($\widetilde{T_{ijk}}$) and the second time ($\widetilde{R_{ijk}}$); form a second matrix (b) comprising the third time ($\widetilde{R_{jik}}$) and the fourth time ($\widetilde{T_{ijk}}$); form a third matrix (θ) comprising a plurality of synchronization parameters (α; β) the propagation delay for the communication link (τ˜); and solve θ=bA$^{-1}$.

In an embodiment the at least one iteration equals four iterations.

In an embodiment, when determining the device is configured to receive the fourth time ($\widetilde{T_{ijk}}$) in the response to the uplink message.

In an embodiment the device is further configured to update a local time reference of the communication apparatus using the calculated propagation delay (τ˜), the calculated clock offset (φ˜), and the calculated clock skew (ω˜).

In an embodiment the first time is the start of a time period ($T_{period}$); and the device is further configured to determine the estimated propagation delay (($\widehat{T_p}^n)^k$) by: receiving at least one downlink message, each downlink message being associated with a first round trip delay ($T_{roundAi}$), a second round trip delay ($T_{roundB(n+1-i)}$), a first reply time ($T_{replyA(n+1-i)}$) and a second reply time ($T_{replyB1}$) wherein; the first round trip delay ($T_{roundAi}$) equals a time difference between transmitting the uplink message and receiving a downlink message; the first reply time ($T_{replyA(n+1-i)}$) equals a difference between the time period ($T_{period}$) and the first round trip delay ($T_{roundAi}$); the second reply time ($T_{replyB1}$) equals a time difference between a second communication apparatus receiving the uplink message and transmitting the downlink message; and the second round trip time ($T_{roundB(n+1-i)}$) equals a difference between the time period ($T_{period}$) and the second reply time ($T_{replyB1}$). The estimated propagation delay determined by: determining a first difference between the first round trip delay ($T_{roundAi}$) and the first reply time ($T_{replyA(n+1-i)}$); determining a second difference between the second round trip time ($T_{roundB(n+1-i)}$) and the second reply time ($T_{replyB1}$); and calculating the estimated propagation delay ($\widehat{T_p}^i$) based on the sum of the first difference ($T_{roundAi}-T_{replyA(n+1-i)}$) and the second difference ($T_{roundB(n+1-i)}-T_{replyBi}$).

In an embodiment the estimated propagation delay (τ) is determined based on a Timing Advance (TA) value.

Precision Time Protocol (PTP) has previously been used in wired systems to synchronize time between two devices.

FIG. 1 shows a prior art version of Precision Time Protocol (PTP). IEEE 1588 Precision Time Protocol (PTP) is the de-facto standard for industrial time synchronisation. Precision Time Protocol (PTP) exchanges timestamps between a master and a slave device in order to determine a timing offset, $T_{offset}$, between the master clock and the slave clock.

In step 101 the master device transmits a SYNC message. The master device records a first timestamp, $t_1$, when the SYNC message is transmitted and the slave device records a second timestamp, $t_2$, when the SYNC message is received. In step 102 the master device transmits a FOLLOW_UP message comprising the first timestamp $t_1$. Now the slave device has timestamps $t_1$ and $t_2$.

In step 103 the slave device transmits a DELAY_REQ message and records a third timestamp, $t_3$, when the message is transmitted. The master device records a fourth timestamp, $t_4$, when the DELAY_REQ message is received. In step 104 the master device transmits a DELAY_RESP message comprising the fourth timestamp, $t_4$. Now the slave device has timestamps $t_1$, $t_2$, $t_3$ and $t_4$. Once these timestamps has been obtained the slave device calculates a timing offset representing the offset of the slave clock with respect to the master clock taking account of the link/propagation delay from the master device to the slave device using:

$$T_{offset} = \frac{(t2 + t3 - t1 - t4)}{2}$$

This can then be used to update the slave clock, thereby synchronizing the slave device and the master device in time.

Precision Time Protocol (PTP) is often used for time synchronisation in wired networks where the propagation time between the master device and the salve device, as well as the processing times at the master device and the salve device are predictable. However, this cannot be guaranteed in wireless networks.

Communications in 5G networks are often the subject of scheduling delays and retransmissions, resulting in timing uncertainty (i.e. variations) at the air interface. Consequently, when Precision Time Protocol (PTP) is used in wireless networks the accuracy can decrease.

Furthermore, in order to accurately compensate for propagation delay at the physical layer, Precision Time Protocol (PTP) requires a communication link that is approximately symmetrical (i.e. has the same properties irrespective of the direction of communication). This cannot be guaranteed in wireless systems as the uplink and downlink could have different characteristics (e.g. propagation delays).

Finally, Precision Time Protocol (PTP) requires hardware timestamping at the physical layer at both ends of the radio interface. This requirement imposes additional complexity at every node in the deployment and it is often undesirable in wireless networks where the devices are not generally manufactured with this functionality. As a result, a new approach to timing synchronisation is required that is suitable for use in wireless networks.

FIG. 2 shows two time sensitive networks connected via a wireless interface according to an embodiment. FIG. 2 shows a system comprising a master Time Sensitive Network (TSN) 201 communicatively coupled to a gNodeB 202 (i.e. a 5G base station). The gNodeB 202 communicates via a 5G radio interface 205 with a User Equipment (UE) 203, which is also communicatively coupled to a slave Time Sensitive Network (TSN) 204.

Synchronising two Time Sensitive Networks (TSN) over a 5G radio interface 205 comprises; communicating a reference time from the master Time Sensitive Network (TSN) 201 to the slave Time Sensitive Network (TSN) 204 and adjusting the reference time to account for any delay in receiving the message (e.g. device processing times and propagation time).

As discussed above, Time-Sensitive Communication (TSC) has a synchronization requirement of 1 µs. Consequently, the total error (i.e. $e_{total}$) after synchronization between the time at the master Time Sensitive Network (TSN) and the time at the slave Time Sensitive Network (TSN) must be less than 1 µs. The main sources of end-to-end synchronisation error in a wireless system include false timing information, incorrect interpretation of timing information and incorrect local timing at the device.

A first source of timing error, $e_1$, is due to the inaccuracies when synchronising the time between the master Time Sensitive Network (TSN) 201 and the gNodeB 202. Where time is synchronised via a User Plane Function (UPF) of the gNodeB 202 using the generic Precision Time Protocol (gPTP), the timing error is generally less than 100 ns (i.e. $e_1$<100 ns).

A second source of timing error, $e_2$, is due to inaccuracies when synchronising the time between the User Equipment (UE) 203 and the salve Time Sensitive Network (TSN) 204. Where time is synchronised using the generic Precision Time Protocol (gPTP), the timing error is generally less than 40 ns (i.e. $e_2$<40 ns).

A third source of timing error, $e_3$, is due to uncertainty in the timing value over the air interface between the gNodeB 202 and the User Equipment (UE) 203. As a result, the total error after synchronisation equals:

$$e_{total} = e_1 + e_2 + e_3$$

The uncertainty of the timing value over the air interface (i.e. $e_3$) can further be divided into three quantities; the gNodeB timing error ($e_{gNB}$), the error in the downlink frame timing applied by the UE ($e_{UE}$) and the error in the estimation of the downlink propagation delay ($e_{PD}$).

$$e_3 = e_{gNB} + e_{UE} + e_{PD}.$$

$$e_{total} = e_1 + e_2 + e_3 = e_1 + e_2 + e_{gNB} + e_{UE} + e_{PD}$$

The gNodeB timing error ($e_{gNB}$) is due to the Timing Alignment Error (TAE) between different transmission branches of the gNodeB. 5G New Radio (NR) base stations generally transmit signals via two or more antennas, where each antenna has its own connector. It is common for the Radio frequency (RF) signal driving each antenna to experience slightly different delays in relation to each other. This is known as the Timing Alignment Error (TAE) and has a maximum value in the 5G specification of ±65 ns (i.e. $e_{gNB}$<±65 ns).

The downlink frame timing applied by the UE ($e_{UE}$), otherwise known as the User Equipment (UE) error, encompasses the detection error of the downlink signal at User Equipment (UE), and the device's processing jitter (i.e. the variability in the processing time at the User Equipment (UE)). In an embodiment the downlink frame timing applied by the UE ($e_{UE}$) is less than 260 ns for a SubCarrier Spacing (SCS) of 30 kHz (i.e. $e_{UE}$≤±260 ns).

The propagation delay error, $e_{PD}$, is the error associated with the determined value of the propagation delay across the wireless network. When providing timing information across a wireless communication channel it is important to account for the propagation delay associated with communication of the message comprising the reference time. For large service areas (i.e. where there is a relatively large path between the gNodeB and the User Equipment (UE)) the propagation delay can be derived from the Timing Advance (TA).

The Timing Advance (TA) is used in 5G New Radio (NR) to advance or retard the uplink transmissions from each User Equipment (UE) in order to account for the distance-dependent propagation delay for messages received from, and transmitted to the serving gNodeB. This has the effect of preventing collisions.

The Timing Advance (TA) is generated from the network access request when the gNodeB estimates the propagation delay between the User Equipment (UE) and the gNodeB. The Timing Advance (TA) is an offset, applied by the User Equipment (UE), to account for the delay in receiving a downlink communication from the gNodeB and the delay in an uplink transmission reaching the gNodeB. Consequently, the Timing Advance is roughly equal to double the propagation delay. As a result, it is possible to use the Timing Advance (TA), when expressed in seconds, to generate an estimate of the propagation delay according to:

$$PD = \frac{TA}{2}$$

Based on this it is also possible to estimate the error in the propagation delay, $e_{PD}$), value according to:

$$e_{PD} = \frac{e_{TA}}{2}$$

Where $e_{TA}$ is the error in the Timing Advance (TA) value. The error in the Timing Advance, $e_{TA}$, includes:
a gNodeB estimation error of uplink transmit timing, $e_{TAg_{gNB}}$,
a relative Timing Advance (TA) accuracy error, $e_{TAA}$,
a timing advance granularity error, $e_{TAG}$,
an uplink downlink propagation delay difference due to asymmetry, $e_A$: and a User Equipment (UE) downlink frame timing error with Timing Advance (TA) adjustment $e_{TA_{UE}}$.

The gNodeB estimation error of uplink transmit timing, $e_{TA_{gNB}}$, represents the imperfect User Equipment (UE) timing estimation at the gNodeB. This error depends on the gNodeB receiver detection algorithm as well as the configuration of the uplink reference signals that are used to perform the uplink timing detection and adjustments. In an embodiment the gNodeB estimation error of uplink transmit timing, $e_{TA_{gNB}}$ is less than 100 ns (i.e. $e_{TA_{UE}}$<100 ns).

The uplink downlink propagation delay difference due to asymmetry, $e_A$, represents an error that is present when the uplink and downlink channels are asymmetric (e.g. have different communication properties depending on the direction of traffic flow). More specifically, the Timing Advance (TA) estimates the uplink propagation delay (i.e. from the User Equipment (UE) to the gNodeB) whereas the reference time indication needs to be adjusted to account for a Downlink propagation delay (i.e. from the gNodeB to the User Equipment (UE)). Consequently, there will be an error introduced where the channel is asymmetric and the propagation delay is derived from the Timing Advance (TA). In an embodiment the uplink downlink propagation delay difference due to asymmetry, $e_A$, is less than 30 ns (i.e. $e_A$<30 ns)

The timing advance granularity error, $e_{TAG}$, represents an error due to the sensitivity with which the Timing Advance (TA) is specified (i.e. the range of times represented by a single Timing Advance (TA) value). In an embodiment the timing advance granularity error, $e_{TAG}$, is less than 65 ns (i.e. $e_{TAG}$<65 ns).

The relative Timing Advance (TA) accuracy error, $e_{TAA}$, represents the User Equipment (UE) error due to timing advance adjustment granularity error. This error arises because the gNodeB expresses the Timing Advance (TA) in milliseconds and the User Equipment (UE) adjusts the time in microseconds. In an embodiment the relative Timing Advance (TA) accuracy error, $e_{TAA}$, is less than 130 ns for a SubCarrier Spacing (SCS) of 30 kHz (i.e. $e_{TAA}$<130 ns).

The User Equipment (UE) downlink frame timing error with Timing Advance (TA) adjustment $e_{TA_{UE}}$, represents the jitter in downlink transmit time. This value negates the gNodeB estimation error of uplink transmit timing, $e_{TA_{gNB}}$. In an embodiment the User Equipment (UE) downlink frame timing error with Timing Advance (TA) adjustment $e_{TA_{UE}}$ is less than 260 ns (i.e. $e_{TA_{UE}}$<260 ns).

Thus the total end-to-end synchronisation error can be expressed as:

$$e_{total}=e_1+e_2+e_{gNB}+e_{UE}+(e_{TA_{gNB}}+e_{TAA}+e_{TAG}+e_A-e_{TA_{UE}})/2$$

Using each of the example delays presented above result in a total end-to-end synchronisation error of less than 0.5 μs (i.e. $e_{total}$<0.5 μs).

This value is below the synchronization requirement of 1 μs and therefore, on the face of it, it would appear that current techniques could be used for Time-Sensitive Communication (TSC). However, in practice, estimating the propagation delay based on the Timing Advance (TA) adjustment can lead to further uncertainties that cannot be readily quantified. For example, underlying assumptions in how the Timing Advance (TA) value is selected can cause further errors. This has the effect of increasing the synchronization error above a level that is tolerable in Time-Sensitive Communications (TSC).

As discussed above, during the random access (RA) procedure the gNodeB measures the time of arrival (TOA), τ, of a signal in order to generate the Timing advance (TA).

The time of arrival (TOA) being the propagation time from the User Equipment (UE) to the gNodeB (i.e. the basestation). The time of arrival (TOA), τ, is generally estimated by extracting the first strongest arrival path or the strong signal from the received waveform. As known in the art, the time of arrival (TOA), τ, can be measured by the receiver (in this case the gNodeB) performing a cross-correlation of the received signal (transmitted by the User Equipment (UE)) with a known preamble. In this case, identifying the first strongest arrival path comprises using a correlation-based method (set in the receiver algorithm) to detect the first arrival path with the strongest signal (also known as the signal with maximum correlation). The maximum correlation value is based on a predetermined threshold set in the receiver algorithm. In some cases, there can be a set of time of arrival (TOA) values since there are a number of points in the received signal (e.g. due to multipath) that exceed the predetermined threshold for identifying maximum correlation. In this case, the first strong arrival path is used. Using this method to calculate the time of arrival (TOA), τ, is an acceptable assumption where the communication path between the User Equipment (UE) and the gNodeB is line of sight. However in non-line of sight environments where the received waveform comprises a plurality of time-delayed signals of roughly equal power, this assumption breaks down as it is no longer accurate to assume that the first received signal is representative of the propagation delay. As a result, in this situation, an inaccurate Timing Advance (TA) would be generated, which would be used to determine an inaccurate propagation delay for compensation during time synchronization.

Furthermore, the estimated time of arrival (TOA), $\tilde{\tau}$, measured by basestation (gNodeB) is equal to the true time of arrival (TOA), τ, affected by a set of errors, $\varepsilon_i$, equal to:

$$\varepsilon_i=X_i+W_i+\eta_i$$

Where $W_i$ is the discrete quantization error, $\eta_i$ is a positively biased random variable representing the non-Line-of-Sight (LOS) error due to delay spread and $X_i$ represents the measurement noise and is an identically distributed normal, and zero mean, random variable with variance $\sigma_i^2$ (i.e. $X_i \sim N(0,\sigma_i^2)$. The variance, $\sigma_i^2$, bounded by the Cramer-Rao Lower Bound (CRLB) is given by:

$$\sigma_i^2 \geq \frac{1}{8\pi^2 * SNR * BW * T_s * F_c^2}$$

Where SNR is the signal to noise ratio, BW is the bandwidth of the signal, $T_s$ is the signal duration, and $F_c$ is the center frequency of the signal. Consequently, the estimated time of arrival (TOA), $\tilde{\tau}$, measured by base stating (gNodeB) becomes:

$$\tilde{\tau}=\tau+\varepsilon_i=\tau+X_i+W_i+\eta_i$$

Deriving a Timing Advance (TA) adjustment from an estimated time of arrival, $\tilde{\tau}$, can therefore increase the error, or uncertainty, in the synchronization, because the error present in the estimated time of arrival, $\tilde{\tau}$, propagates through all of the calculations thereby adding further error to the propagation delay.

The devices themselves also represent another source of uncertainty when synchronizing time sensitive networks. The timing accuracy of the User Equipment (UE) and the gNodeB depend on the frequency and phase stability of the onboard oscillators in the device (that generate the timing reference (i.e. clock) signals).

A device maintains its own sense of time (i.e. a clock) by counting the pulses of an internal oscillator. In practical devices there can be inaccuracies and instability in the phase and frequency of the oscillator. This can result in a clock skew (i.e. a difference in the time between two clocks) and a clock drift (i.e. a difference in rates between two clocks) being observed.

If the clock in a device is the subject of clock skew or clock drift then the device will quickly become unsynchronized. For example, if a clock has a frequency drift of up to 3 ppm/s (parts per million/second) and a clock jitter of 3 μs per second, then to maintain the over-the-air frequency errors to less than 0.5 μs the device would need a time update interval of 6 times per second i.e. every 160 ms.

In light of the above, a new approach to time synchronization is required which can accurately determine the propagation delay and account for the clock skew and clock offset in the user Equipment (UE).

FIG. 3 shows a 5G wireless network connecting two time-sensitive networks according to an embodiment. FIG. 3 shows a system comprising a Master time-sensitive network 301 (comprising a Programmable Logic Controller (PLC)) communicatively coupled to a slave time-sensitive network 303 (comprising an industrial robot) via a 5G wireless network 302.

In order synchronise the time of the master and the slave time-sensitive networks (301 and 303) it is necessary for master time-sensitive network (TSN) 301 to share the original TSN time from the TSN grand master (GM) 304 with the slave time-sensitive network 303.

In FIG. 3 the original TSN time from TSN grand master (GM) 304 is communicated via a User Plane Function (UPF)/translator 305 to a gNodeB 306. As known in the art, a User Plane Function (UPF) 305 is a component of the 5G architecture that supports packet routing, forwarding, interconnections to the data network and data buffering.

The User Plane Function (UPF)/translator 305 is time synchronized to the TSN grandmaster (GM) 304. In an embodiment, this is achieved using generic Precision Time Protocol (gPTP) over a wired connection.

The User Plane Function (UPF) provides TSN grandmaster (GM) time to the gNodeB 306 using a control-plane or user-plane message. In an embodiment, this is achieved using generic Precision Time Protocol (gPTP).

In FIG. 3 the gNodeB 306 communicates the original TSN time to a User Equipment (UE) 307 using a wireless communication channel. The User Equipment (UE)/translator 307 is configured to share the original TSN time and a residence time of the message within the 5G wireless network 302, with the slave time-sensitive network 303.

Optionally, the user Equipment (UE) 307 communicates the original TSN time with the slave time-sensitive network 303 using generic Precision Time Protocol (gPTP).

The system shown in FIG. 3 comprises two timing domains, namely the Time Sensitive Network (TSN) time domain and the 5G time domain. In the system of FIG. 3 the 5G system is characterised as a black box system. During time synchronization a generic Precision Time Protocol (PTP) message comprising the Time Sensitive Network (TSN) Grand Master (GM) time is transmitted from the TSN Grand Master (GM) 304 to the translator 305. Once the translator 305 receives the TSN Grand Master time, the translator generates an ingress timestamp (i.e. an indication of the time when the timing message entered the 5G domain). The ingress timestamp is appended to the received message (comprising the TSN Grand Master (GM) time) and is subsequently communicated via the gNodeB 306 to the User Equipment (UE)/translator 307. The translator 307 generates an egress timestamp corresponding to the time when the message (comprising the TSN Grand Master (GM) time) was received by the User Equipment (UE)/translator 307. The difference between the ingress timestamp and the egress timestamp represents the residence time of the message within the 5G wireless network 302. This residence time is then communicated, along with the TSN Grand Master (GM) time, to the slave Time-Sensitive Network 303 where the slave Time Sensitive Network adjusts the TSN Grand Master (GM) time to account for the residence time.

In the system of FIG. 3 the TSN Grand Master (GM) time is not altered as it moves throughout the 5G wireless network 302. Furthermore the ingress and egress timestamps (used to determine the residence time) are measured with respect to the 5G time domain provided to the gNodeB 306 and the User Equipment (UE) 307 from a 5G grand master clock. Consequently, inaccurate time synchronization between the gNodeB 306 and the User Equipment (UE) 307 can lead to inaccurate residence time determination and can adversely affect the ability to synchronize time sensitive networks that communicate via the 5G wireless network 302.

Figure 4:
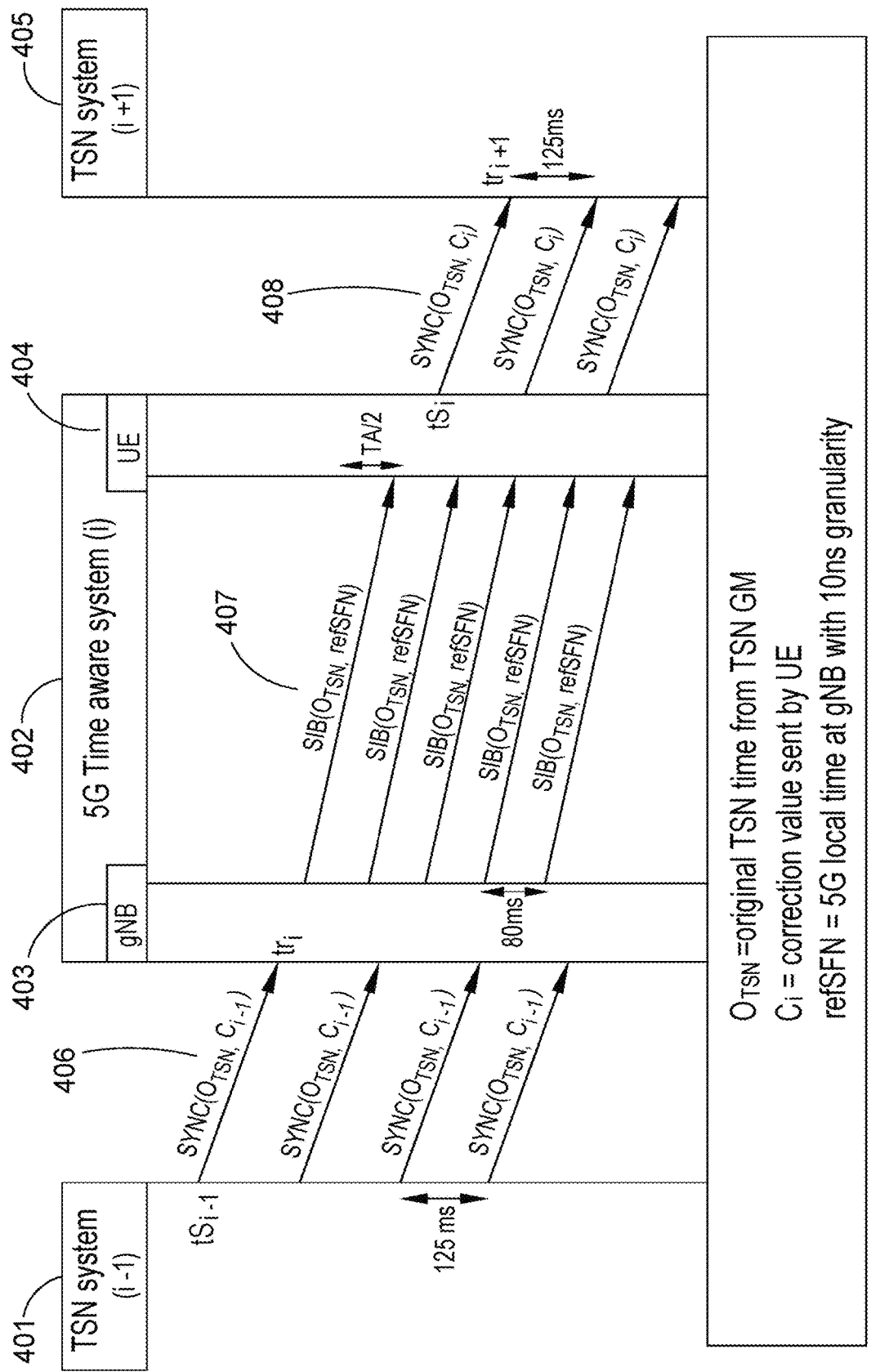
FIG. 4 shows a system for performing end-to-end reference time synchronisation according to an embodiment.

FIG. 4 shows a system for performing end-to-end reference time synchronisation according to an embodiment. FIG. 4 shows a master Time Sensitive Network (TSN) 401 and a slave Time Sensitive Network (TSN) 405 connected via a 5G wireless network 402. In the embodiment of FIG. 4 the master Time Sensitive Network (TSN) 401 is synchronized to a Time Sensitive Network (TSN) grand master (GM) clock and the 5G wireless network 402 comprises a gNodeB 403 and a User Equipment (UE) 404.

In FIG. 4 the master Time Sensitive Network (TSN) 401 is communicatively coupled to the gNodeB 403 and the slave Time Sensitive Network (TSN) 405 is communicatively coupled to the User Equipment (UE) 404. In FIG. 4 the master Time Sensitive Network (TSN) 401 is the $(i-1)^{th}$ system, the 5G wireless network 402 is the Or system and the slave Time Sensitive Network (TSN) 405 is the $(i+1)^{th}$ system.

In FIG. 4 end-to-end synchronisation of the reference time occurs by the master Time Sensitive Network (TSN) 401 transmitting a first synchronisation (SYNC) message 406 to the 5G wireless network 402 (i.e. between the master Time Sensitive Network (TSN) domain and the 5G domain) at time $tS_{i-1}$. The first synchronisation (SYNC) message 406 comprises the original reference TSM time, $O_{TSN}$, for synchronisation across the system and a correction value, $C_{i-1}$. In the embodiment of FIG. 4 the correction values (i.e. $C_{i-1}$ and $C_i$) are used to communicate ingress and residence time stamps. In FIG. 3 the User Plane Function (UPF)/translator 305 generates an ingress timestamp ($TS_i$) indicating the time, as measured by the 5G clock, when the original reference TSM time, $O_{TSN}$, is received by User Plane Function (UPF)/translator 305. This ingress time is communicated to the gNodeB 403 in the correction value, $C_{i-1}$ of the synchronization (SYNC) message.

In an embodiment the synchronization (SYNC) message 406 is periodically communicated (with the reference time updated accordingly). Optionally synchronization (SYNC) messages are communicated from the master Time Sensitive Network (TSN) 401 to the 5G wireless network 402 every 125 ms.

The gNodeB 403 of the wireless network 402 receives the first synchronisation (SYNC) message 406 at time tn. The gNodeB 403 calculates the time delay between the receiving the original reference TSM time, $O_{TSN}$, at the User Plane Function (UPF)/translator 305 (i.e the current ingress timestamp time provided in the correction value field, $C_{i-1}$ of the synchronization (SYNC) message) and transmitting the original reference TSM time, $O_{TSN}$, at the gNodeB 403. The ingress timestamp can then be compensated by the gNodeB 403 to account for this delay.

In the network of FIG. 3 the synchronization (SYNC) message 406 is communicated over a wired connection. Consequently, the delay, or time spend between the User Plane Function (UPF)/translator 305 and the gNodeB 403 can be considered to be very small or negligible.

After compensating the ingress timestamp (if at all), the gNodeB 403 transmits the ingress timestamp and the original reference TSM time, $O_{TSN}$, to the User Equipment (UE) 404. In one embodiment the gNodeB 403 transmits the reference time using a broadcast System Information Block (SIB), preferably SIB9. In 5G New Radio (NR) System Information Block 9 (SIB9) contains information related to GPS time and Coordinated Universal Time (UTC).

In FIG. 4 the gNodeB 403 transmits a System Information Block (SIB) 407 comprising the original 60-bit reference TSM time, $O_{TSN}$, and a 30 bit 5G reference time, refSFN, corresponding to the local time at the gNodeB 403 specified with 10 ns granularity. The 5G reference time, refSFN, comprises a 10 bit System Frame Number (SFN) providing subframe level timing in milliseconds and a 20 bit reference offset (ref_offset) providing slot level timing in nanoseconds.

In FIG. 4 the 5G reference time, refSFN, comprises the (compensated) ingress timestamp which indicates the time at the subframe boundary, at or immediately after the ending boundary in which the System Information Block (SIB) 407 is transmitted by the gNodeB 403. This time is also referred to as $O_{5G}$.

In FIG. 4 the gNodeB 403 transmits a System Information Block (SIB) 407 every 80 ms whereas synchronization (SYNC) message 406 is transmitted by the master Time Sensitive Network (TSN) 401 is transmitted every 125 ms. As a result, there may be instances where a System Information Block (SIB) 407 contains a reference TSM time, $O_{TSN}$, that has already been transmitted in a previous System Information Block (SIB) 407. An example of this is the second System Information Block (SIB) 407 in FIG. 4. In this case the reference TSM time, $O_{TSN}$, is the same between the first and second System Information Block (SIB) message. However the 5G reference time, refSFN, is updated in the second System Information Block (SIB) message.

A common notion of time is maintained within the 5G wireless network 402 by the gNodeB 403 periodically transmitting timestamps to the User Equipment (UE) 404. In response the User Equipment (UE) aligns its clock using the received timestamps and an adjustment values that is based on the over-the-air transit time.

In FIG. 4 the User Equipment 404 (equivalent to the User Equipment (UE)/Translator 307 in FIG. 3) generates an egress timestamp ($TS_e$) in response to receiving a System Information Block (SIB) 407 comprising the original reference TSM time, $O_{TSN}$, and the reference time, refSFN (comprising the (compensated) ingress timestamp ($TS_i$)). The difference between the egress timestamp ($TS_e$) and the ingress timestamp ($TS_i$) represents the residence time spent within the 5G network.

After generating the egress timestamp ($TS_e$), the User Equipment (UE) 404 determines the residence time spent within the 5G network. The User Equipment (UE) 404 subsequently transmits a second SYNC message 408 comprising the original reference TSM time, $O_{TSN}$, and a correction value, $C_i$, the correction value $C_i$ comprising the residence time spent within the 5G network calculated from the ingress and egress timestamps. The second SYNC message 408 is subsequently used by the slave Time Sensitive Network (TSN) 405 to synchronize its local timing with the master Time Sensitive Network (TSN) 401.

In an embodiment the synchronization (SYNC) message 408 is periodically communicated (with the reference time updated accordingly). Optionally, synchronization (SYNC) messages are communicated from the 5G wireless network 402 to the slave Time Sensitive Network (TSN) 405 every 125 ms.

In order to maintain a consistent 5G time reference in the wireless network 402 (and therefore generate accurate ingress and egress timestamps) the User Equipment (UE) 404 must update its timing so it is consistent with the gNodeB 403. To do this, the User Equipment (UE) 404 adjusts its timing based on timing information transmitted by the gNodeB 403 once adjusted for the propagation delay between the gNodeB 403 transmitting the timing information and the User Equipment (UE) 404 receiving the timing information. The propagation delay τ can be estimated from the Timing Advance (TA). For example, the propagation delay, τ, for 30 KHz sub carrier spacing (SCS) can be calculated using:

$$\tau = (TA*16*62)/2$$

In some cases, deriving the propagation delay from the Timing Advance (TA) is not accurate enough for timing synchronization. Deriving the propagation delay in this way lacks granularity in microseconds and the measurement itself can be the subject of channel random errors as described above.

In an embodiment, the User Equipment (UE) 404 uses Time Sensitive Synchronization (TeSSa) to determine the propagation delay across the over-the-air interface and/or to monitor and correct for the clock offset and clock skew at the User Equipment (UE) 404.

These errors are then used to compensate the time reference at the User Equipment (UE) 404, which is subsequently used to generate an egress time stamp, and calculate a residence time based on the egress timestamp and the, 5G reference time, $0_{5G}$ (also known as refSFN) received in the System Information Block (SIB). As discussed above, the synchronization (SYNC) message 408 transmitted by the User Equipment (UE) 404 comprises the residence time included in the correction value $C_i$ and the original TSN time, $O_{TSN}$, which is subsequently used by the slave time sensitive network 405 to synchronize its timing with the master time sensitive network 401.

By measuring and compensating for the propagation delay, the clock offset and clock skew at the User Equipment (UE) 404, the Time Sensitive Synchronization (TeSSa) method is able to reduce the time synchronization error below the limit required for Time-Sensitive Communication (TSC).

In an embodiment, Time Sensitive Synchronization (TeSSa) comprises three modes of operation, namely: fine synchronization, coarse synchronization, and both fine and coarse synchronization.

Figure 5:
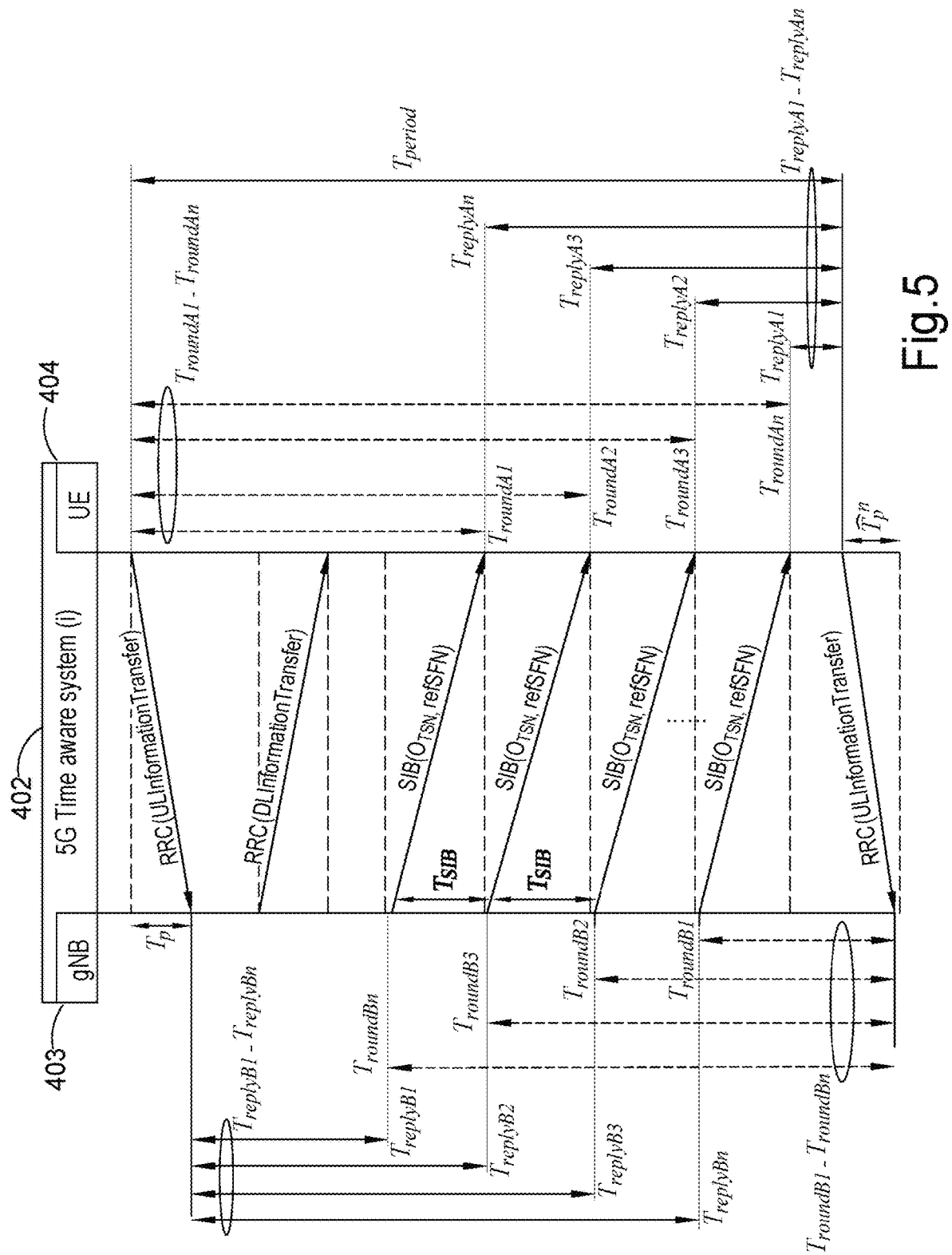
FIG. 5 shows an exchange of messages used in a fine synchronisation mode of the Time Sensitive Synchronization (TeSSa) according to an embodiment.

FIG. 5 shows an exchange of messages used in a fine synchronisation mode of the Time Sensitive Synchronization (TeSSa) according to an embodiment. FIG. 5 shows an exchange of 5G physical layer messages for calculating propagation delay and error between a gNodeB 403 and a User Equipment (UE) 404 in a 5G wireless network 402.

In an embodiment, Time Sensitive Synchronization (TeSSa) uses existing 5G physical layer signalling, namely periodic System Information Block (SIB) messages broadcast every $T_{SIB}$ seconds and unicast Radio Resource Control (RRC) messages transmitted every $T_{period}$ seconds.

Since Radio Resource Control (RRC) messages consume network resources (as opposed to System Information Block (SIB) messages which are routinely scheduled), it is preferable for $T_{period}$ to be greater than $T_{SIB}$ (i.e. $T_{period} > T_{SIB}$) In an embodiment $T_{period} = nT_{SIB}$, where $T_{SIB} = 80$ ms.

In an embodiment the User Equipment (UE) 404 periodically transmits a Radio Resource Control (RRC) Uplink Information Transfer (ULInformationTransfer) message. The User Equipment (UE) 404 also receives a plurality of System Information Block (SIB) messages and a Radio Resource Control (RRC) Downlink Information Transfer (DLInformationTransfer) message in response to the transmitted RRC(ULInformationTransfer) message. Scheduling for these messages is in accordance with the 5G New Radio (NR) communication standard.

Using the timing relationships shown in FIG. 5, a first round trip delay is defined as:

$$T_{roundAi} = 2\widehat{T}_p{}^i + T_{replyBi}, \forall 1 \leq i \leq n$$

and a second round trip delay is defined as:

$$T_{roundBi} = 2\widehat{T}_p{}^i + T_{replyAi}, \forall 1 \leq i \leq n$$

Where $\widehat{T}_p{}^i$ is the estimated propagation delay. Summing both of these equations, results in an estimated propagation delay, $\widehat{T}_p{}^i$, of:

$$\hat{T}_p^i = \frac{1}{4n} \sum_{i=1}^{n} \{(T_{roundAi} - T_{replyAi}) + (T_{roundBi} - T_{replyBi})\}$$

This can also be expressed as:

$$\hat{T}_p^i = \frac{1}{4n} \sum_{i=1}^{n} \{(T_{roundAi} - T_{replyA(n+1-i)}) + (T_{roundB(n+1-i)} - T_{replyBi})\}$$

The User Equipment (UE) 404 then determines a first round trip delay time, i.e. $T_{roundA1}$, based on the time difference (measured by the User Equipment (UE) 404) between transmitting an RRC(ULInformationTransfer) message and receiving a first System Information Block (SIB) message.

The User Equipment (UE) 404 then determines a second reply time, i.e. $T_{replyB1}$. The User Equipment (UE) 404 can obtain the time difference between the gNodeB 403 receiving the RRC(ULInformationTransfer) message and the gNodeB 403 transmitting the first System Information Block (SIB), i.e. $T_{replyB1}$, in a number of different ways.

According to a first approach, the User Equipment (UE) 404 receives the first System Information Block (SIB). The User Equipment (UE) 404 then determines $T_{replyB1}$ according to $T_{roundA1} = 2T_p + T_{replyB1}$. As discussed above, the refSFN (contained within the first System Information Block (SIB)) indicates the time of the subframe boundary at or immediately after the ending boundary in which the System Information Block (SIB) is transmitted by the gNodeB 403. Using refSFN included in the System Information Block (SIB), the User Equipment (UE) 404 calculates the propagation delay, $T_p$, based on the difference between the time when the first System Information Block (SIB) was received at the User Equipment (UE) 404 and the time when the first System Information Block (SIB) was transmitted by the gNodeB 403 (i.e. refSFN). The User Equipment (UE) 404 measures $T_{roundA1}$ using its own internal clock as discussed above. Based on these values, the User Equipment (UE) 404 calculates $T_{replyB1}$ according to the above equation.

According to a second approach, the gNodeB 403 determines $T_{replyB1}$ based on the time difference between receiving the RRC(ULInformationTransfer) message and transmitting the first System Information Block (SIB) message. In an embodiment, each System Information Block (SIB) message comprises a SIB9 message. As discussed above, the SIB9 block comprises timing information related to GPS time and Coordinated Universal Time (UTC). In the second approach the gNodeB 403 calculates $T_{replyB1}$ and includes this values in the contents of SIB9, optionally within the Coordinated Universal Time (UTC) field.

According to a third approach, the gNodeB 403 calculates $T_{replyB1}$ as in the second approach as well as every subsequent second reply time (i.e. $T_{replyB2}$, $T_{replyB3}$, etc.) using the same calculation. The calculated second reply times (e.g. $T_{replyB1}$, $T_{replyB2}$, $T_{replyB3}$ etc.) are transmitted in the System Information Block (SIB) message in place of the 5G reference time, refSFN.

After determining the first round trip delay time, i.e. $T_{roundA1}$, and the second reply time, i.e. $T_{replyB1}$, the User Equipment (UE) 404 determines the other quantities required to estimate the propagation time (i.e. $T_{replyBi}$, $T_{roundBi}$, $T_{replyAi}$, $T_{roundAi}$) with nano second granularity using the following equations:

$$T_{replyBi} = T_{replyB1} + (i-1)T_{SIB} \quad \text{for } 1 \leq i \leq n$$

$$T_{roundBi} = T_{period} - T_{replyB(n+1-i)} \quad \text{for } 1 \leq i \leq n$$

$$T_{roundAi} = T_{roundA1} + (i-1)(T_{SIB} + SIB_{offset}), \quad \text{for } 1 \leq i \leq n$$

$$T_{replyAi} = T_{period} - T_{roundA(n+1-i)} \quad \text{for } 1 \leq i \leq n$$

Where:

$T_{SIB}$ is the time difference between successive System Information Block (SIB) transmissions by the gNodeB;

$T_{period}$ is the time duration between successive RRC uplink transmissions; and $SIB_{offset}$ is the offset between consecutive System Information Block (SIB) beacons received at the User Equipment (UE) 404, calculated using:

$$SIB_{offset} = \left(\frac{\bar{\Delta}}{T_{SIB}} - 1\right) T_{SIB} * T_s$$

Where:

$\bar{\Delta}$ is the mean time between receipt of successive SIBs and is calculated according to:

$$\bar{\Delta} = \sum_{n=1}^{i} \left(\frac{\Delta}{i}\right)$$

where $\Delta$ is the time between receipt of successive SIBs (generally $\Delta > T_{SIB}$), each n is associated with a different $\Delta$, and i is the number of time differences between successive SIBs that have been recorded (or in other words, the number of received SIBs minus one); and $T_s$ is the subframe period in milliseconds.

The time between receipt of successive SIBs, Δ, can vary from the specified time difference $T_{SIB}$ (e.g. 80 ms) depending on the channel conditions. Consequently the value of delta, Δ, and therefore $SIB_{offset}$ can vary between receipt of successive SIBs. In order to determine the time between receipt of successive SIBs, Δ, the User Equipment (UE) 404 stores the refSFN value included in each System Information Block (SIB) message and calculates the difference between the refSFN values included in consecutive SIBs.

It will be appreciated that where the third approach to determining the second reply time is used (i.e. where $T_{replyBi}$ is provided in each System Information Block (SIB) message), there is no need to calculate $T_{replyBi}$ using the above equations because this can be obtained directly from the contents of the relevant System Information Block (SIB) message.

Once the User Equipment (UE) 404 has determined $T_{replyBi}$, $T_{roundBi}$, $T_{replyAi}$, $T_{roundAi}$ for each i upto n (where n equals the number of SIB transmissions in $T_{period}$), the User Equipment (UE) 404 determines an estimated propagation delay, $\widehat{T_p}^i$. Advantageously, with the above method the User Equipment (UE) 404 does not require timestamping for every message exchanged in order to estimate the propagation delay, instead timestamping is only required for $T_{replyB1}$ and $T_{roundA1}$.

The error in the estimated propagation delay is given by:

$$\widehat{e_p}^i = \widehat{T_p}^i - T_p^i$$

Where $T_p^i$ is the propagation delay derived from the Timing Advance (TA). By using the fine synchronization mode of Time Sensitive Synchronization (TeSSa) it is possible to reduce the error by 4n times. Furthermore, the greater the number of SIB transmissions (i.e. the greater the value of n), the more accurate the estimated propagation delay, $\widehat{T_p}^i$.

As discussed above, there are factors other than the propagation delay that contribute to the timing synchronisation error between the gNodeB 403 and the User Equipment (UE) 404. Specifically, the clock skew and the clock offset of the User Equipment (UE) 404.

Figure 6:
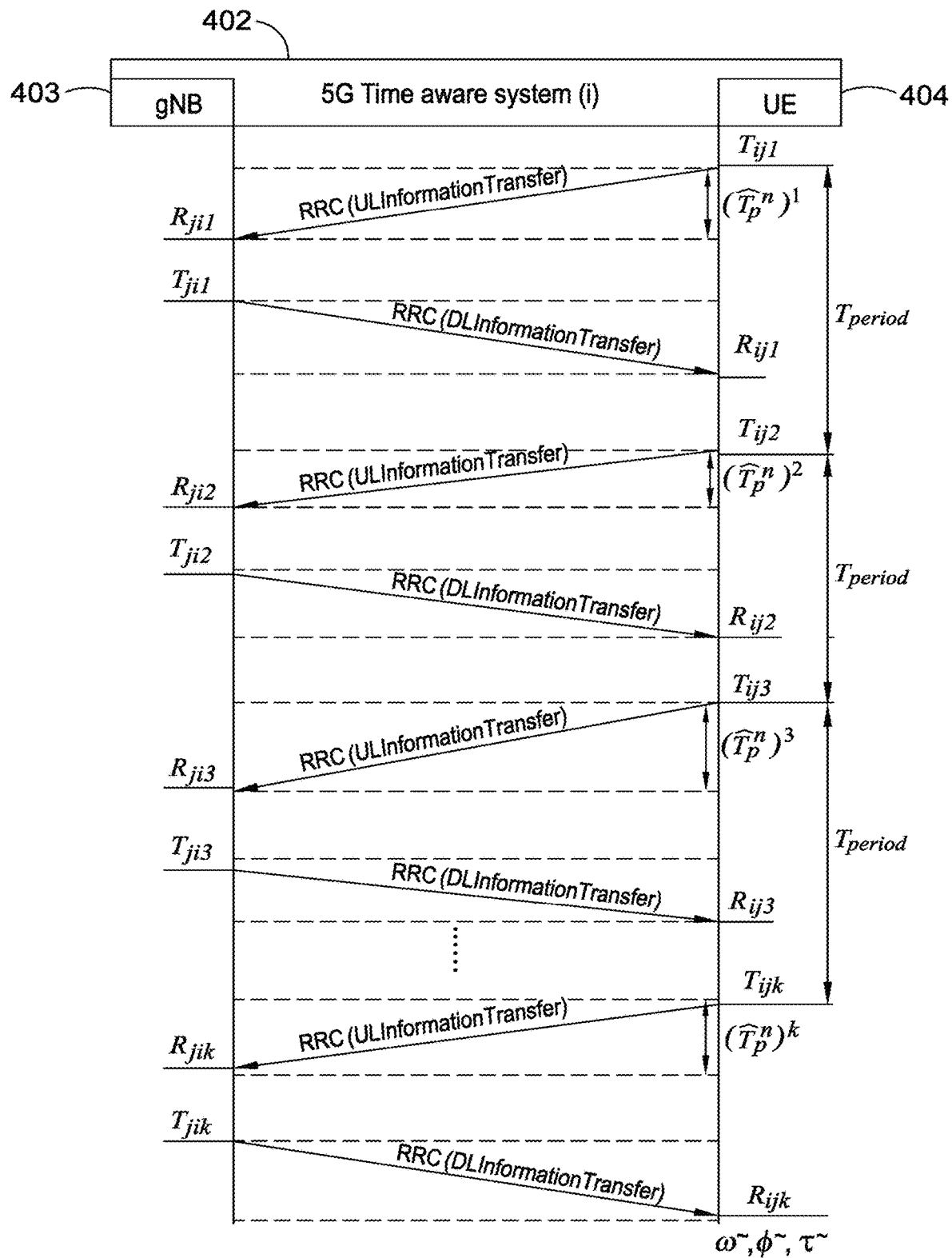
FIG. 6 shows an exchange of messages used in a coarse synchronisation mode of the Time Sensitive Synchronization (TeSSa) according to an embodiment.

FIG. 6 shows an exchange of messages used in a coarse synchronisation mode of the Time Sensitive Synchronization (TeSSa) according to an embodiment. Coarse synchronisation is used to determine a clock skew and a clock offset of the User Equipment (UE) 404. Each course synchronisation block comprises k iterations, where an iteration is a series of message exchanges observed over a duration equal to $T_{period}$. In an embodiment the number of iterations, k, is greater than or equal to 4. Each iteration, of the k iterations, in the coarse synchronization mode is associated with a different timestamp set $S_k$. The timestamp set $S_k$, when measured relative to a reference clock (i.e. in the absence of User Equipment and gNodeB clock offsets and skews), comprises:

$$S_k\{T_{ijk}, R_{ijk}, T_{jik}, R_{jik}, \widehat{T_p}^k\}$$

Where:
k represents the iteration number
$T_{ijk}$ is the time when the User Equipment (UE) 404 transmits an RRC Uplink Information Transfer message, RRC(ULInformationTransfer);

$R_{ijk}$ is the time when the User Equipment (UE) 404 receives an RRC Downlink Information Transfer message, RRC(DLInformationTransfer);

$T_{jik}$ is the time of transmission of the RRC Downlink Information Transfer message, RRC(DLInformationTransfer), by the gNodeB 403. This time is measured from the gNodeB antenna reference point and is included in the RRC Downlink Information Transfer message, RRC(DLInformationTransfer);

$R_{jik}$ is the time at which the gNodeB 403 receives the RRC Uplink Information Transfer message, RRC(ULInformationTransfer).

In the example shown in FIG. 6, the $i^{th}$ node is the User Equipment (UE) 404, and the $j^{th}$ node is the gNodeB 403.

Out of the above timestamps, the only timestamp that is unknown to the User Equipment (UE), 404, is $R_{jik}$. In light of this the User Equipment (UE) calculates the timestamp $R_{jik}$ by adding an estimated propagation delay to $T_{ijk}$ (i.e. the transmission time of the RRC Uplink Information Transfer message, RRC(ULInformationTransfer)).

When the fine synchronisation mode of Time Sensitive Synchronization (TeSSa) is used, the estimated propagation delay $(\widehat{T_p}^n)^k$ estimated for the kth iteration, is used for this calculation. In this case, the timestamp $R_{jik}$ is calculated according to:

$$R_{jik} = T_{ijk} + (\widehat{T_p}^n)^k$$

If, on the other hand, fine synchronisation is not used then the propagation delay calculated from the Timing Advance (TA) during initialization (i.e. τ) is used. In this case, the timestamp $R_{jik}$ is calculated according to:

$$R_{jik} = T_{ijk} + \tau$$

For each iteration of the k iterations the timestamps $(T_{ij}, R_{ij}, T_{ji}, R_{ji})$ can be collected in matrices such that:

$$T_{ij}[T_{ij_1} T_{ij_2} T_{ij_3} \ldots T_{ij_k}]^T$$

$$R_{ij}[R_{ij_1} R_{ij_2} R_{ij_3} \ldots R_{ij_k}]^T$$

$$T_{ji}[T_{ji_1} T_{ji_2} T_{ji_3} \ldots T_{ji_k}]^T$$

$$R_{ji}[R_{ji_1} R_{ji_2} R_{ji_3} \ldots R_{ji_k}]^T$$

The timestamps in each set, $S_k$, are subjected to the clock offsets and clock skews introduced by the User Equipment (UE) 404 and the gNodeB. The clock skews and clock offsets experienced by the User Equipment (UE) 404 and the gNodeB 403 can be due to a number of reasons including imperfections in the local oscillator, oscillator aging, or environmental factors (e.g. temperature).

If $t_1$ is the local time at the $i^{th}$ node, which in FIG. 6 is the User Equipment (UE) 404, and t is the reference time. A first-order affine clock model can be used to analyse timing errors. As known in the art, a first order affine clock represents a clock model exhibiting only offset and rate errors on the assumption that other clock errors are small in comparison. Where a first-order affine clock model is used, the clock skew can be represented as $\omega_i$ where $\omega_i \in R+$ (i.e. the clock skew belongs to a set of positive real numbers) and the clock offset can be represented as $\phi_i$ where $\phi_i \in R$ (i.e. the clock offset belongs to a set of real numbers). In this case the local time, $t_i$, is given by:

$$t_1 = \omega_i t + \phi_i$$

When the User Equipment (UE) 404 and the gNodeB 403 collect the timestamps for each of the above values, they are collected with reference to the local clock (i.e. $t_i$,). If $\alpha_i$ and $\beta_i$ are synchronisation parameters of the $i^{th}$ node such that $\alpha_i = \omega_i^{-1}$ and $\beta_i = -\omega_i^{-1}\phi_i$, then the reference time, t, can be calculated for any given local time, $t_i$, by using:

$$t = \alpha_i t_i + \beta_i$$

The above equation is described in relation to the $i^{th}$ node, which in FIG. 6 is the User Equipment (UE) 404. However, the same logic can be used to calculate the reference time, t, for a reference time recorded at the $j^{th}$ node, which in FIG. 6 is the gNodeB 403. In this case the synchronization parameters for the $j^{th}$ node are $\alpha_j = \omega_j^{-1}$ and $\beta_j^{-1}\phi_j$.

Over the space of k iterations, the unknown synchronisation parameters for a given node (i.e. the $i^{th}$ node or the $j^{th}$ node) can be collected such that:

$$\alpha = [\alpha_0, \alpha_1, \alpha_2 \ldots \alpha_k]^T$$

$$\beta = [\beta_0, \beta_1, \beta_2 \ldots \beta_k]^T$$

From these parameters the unknown clock skew, $\omega$, present at a given node and the unknown clock offset, $\phi$, present at a given node can be calculated using the following equations where $\ominus$ denotes matrix element wise division:

$$\omega = I \ominus \alpha$$

$$\phi = -\beta \ominus \alpha$$

Referring back to the example in FIG. 6, the timestamps collected by the User Equipment 404 and the gNodeB 403 are given by: $\widetilde{T_{ijk}}$, $\widetilde{R_{ijk}}$, $\widetilde{T_{ijk}}$, $\widetilde{R_{jik}}$. Each of these parameters represents the respective timestamp ($T_{ijk}, R_{ijk}, T_{jik}, R_{jik}$) when measured at the local time, i.e. under the influence of clock skew and clock offset introduced by the measuring node (i.e. the gNodeB 403 or the User Equipment (UE) 404). More specifically, the collected time stamps (i.e. $\widetilde{T_{ijk}}$, $\widetilde{R_{ijk}}$, $\widetilde{T_{ijk}}$, $\widetilde{R_{jik}}$) are equal to the reference timestamps (i.e. $T_{ijk}, R_{ijk}, T_{jik}, R_{jik}$) when subjected to clock offsets, $\phi_{UE}, \phi_{gNB} \in R$ and clock skews, $\omega_{UE}, \omega_{gNB} \in R$ at the User Equipment (UE) 404 and the gNodeB 403 respectively. This can be represented as:

$$\widetilde{T_{ij}} = \omega_{UE}[T_{ij_1} T_{ij_2} T_{ij_3} \ldots T_{ijk}]^T + \phi_{UE}$$

$$\widetilde{R_{ij}} = \omega_{UE}[R_{ij_1} R_{ij_2} R_{ij_3} \ldots R_{ijk}]^T + \phi_{UE}$$

$$\widetilde{T_{ji}} = \omega_{gNB}[T_{ji_1} T_{ji_2} T_{ji_3} \ldots T_{jik}]^T + \phi_{gNB}$$

$$\widetilde{R_{ji}} = \widetilde{T_{ij}} + [(\widetilde{T_p}^n)^1, (\widetilde{T_p}^n)^2, (\widetilde{T_p}^n)^3 \ldots (\widetilde{T_p}^n)^k]$$

Where:

$(\widetilde{T_p}^n)^k$ is the estimated propagation delay for the kth iteration;
$\omega_{UE}$ is the clock skew at the User Equipment (UE) 404;
$\phi_{UE}$ is the clock offset at the User Equipment (UE) 404;
$\omega_{gNB}$ is the clock skew at the gNodeB 403;
$\phi_{gNB}$ is the clock offset at the gNodeB 403.

The synchronization parameters to convert the collected timestamps (i.e. $\widetilde{T_{ijk}}$, $\widetilde{R_{ijk}}$, $\widetilde{R_{jik}}$, $\widetilde{T_{ijk}}$) to the reference time (i.e. $T_{ijk}, R_{ijk}, T_{jik}, R_{jik}$) are given by:

$$\alpha_{UE} = \omega_{UE}^{-1}, \alpha_{gNB} = \omega_{gNB}^{-1}, \beta_{UE} = -\omega_{UE}^{-1}\phi_{UE}, \beta_{gNB} = -\omega_{gNB}^{-1}\phi_{gNB}$$

Without any correction, the clock skew and clock offset introduced by the gNodeB 403 and the User Equipment (UE) 404 would create timing inaccuracies and prevent accurate synchronization. As a result, it is desirable to determine the clock skew and clock offset introduced by a node, in order to correct for it in the local timing source.

It can be assumed that the gNodeB 403 has a relatively stable clock oscillator and can be used as a clock reference. Consequently, in order to achieve accurate time synchronization it is only necessary to determine a clock skew $\omega$ and a clock offset $\phi$ of the User Equipment (UE) 404 clock relative to the gNodeB 403 clock. To this end, the parameters $w$ and $\theta$ presented below represent the clock skew and clock offset between the gNodeB 403 and the User Equipment (UE) 404.

Referring back to FIG. 6, it can be seen that:

$$R_{jik} = T_{ijk} + \tau^-$$

$$R_{ijk} = T_{jik} + \tau^-$$

Where $\tau^-$ is the estimated propagation delay.

Since it is assumed that the gNodeB 403 timestamps can be used as a clock reference: $R_{jik} = \widetilde{R_{jik}}$ and $T_{jik} = \widetilde{T_{ijk}}$. As discussed above, the reference times associated with the local timestamps collected by the User Equipment (UE) 404 (i.e. $T_{ijk}$ and $\widetilde{R_{ijk}}$) can be expressed as: $T_{ijk} = \alpha \widetilde{T_{ijk}} + \beta$ and $R_{ijk} = \alpha \widetilde{R_{ijk}} + \beta$, where $\alpha$ and $\beta$ are the synchronization parameters to correct for the relative clock skew and clock offset between the gNodeB 403 and the User Equipment (UE) 404. Substituting these values into the above equation gives:

$$\widetilde{R_{ji}} = \alpha \widetilde{T_{ij}} + \beta + \tau^-$$

$$\widetilde{T_{ji}} = \alpha \widetilde{R_{ij}} + \beta - \tau^-$$

In linear data form this can be represented as:

$$A\theta = b$$

With:

$$A = [(-\widetilde{T_{ij}}^T)(-I_{ij})(-I_{ij}); (\widetilde{R_{ij}}^T)(I_{ij})(-I_{ij})]$$

$$b = -[\widetilde{R_{ji}}^T; -\widetilde{T}_{Jihu \ T}]$$

$$\theta = [\alpha; \beta; \tau^-]$$

Where:
$I_{ij}$ is the identity matrix.
$\alpha = \omega^{-1}$ where $\omega$ is the relative clock skew between the gNodeB 403 and the User Equipment (UE) 404;
$\beta = -\omega^{-1}\phi$ where $\phi$ is the relative clock offset between the gNodeB 403 and the User Equipment (UE) 404.

In light of the above, the method of course synchronization according to an embodiment comprises collecting timestamps $\widetilde{T_{ijk}}$, $\widetilde{R_{ijk}}$, $\widetilde{T_{ijk}}$, $\widetilde{R_{jik}}$. Timestamps $\widetilde{T_{ijk}}$ is generated when the User Equipment (UE) 404 transmits an RRC Uplink Information Transfer message, RRC(ULInformationTransfer). Likewise timestamp $\widetilde{R_{ijk}}$ is generated when the User Equipment (UE) 404 receives the RRC Downlink Information Transfer message, RRC(DLInformationTransfer). The User Equipment (UE) 404 receives the timestamp $\widetilde{T_{ijk}}$ as part of the RRC Downlink Information Transfer message, RRC(DLInformationTransfer), and the User Equipment (UE) 404 determines the timestamp $\widetilde{R_{jik}}$ using the propagation delay provided to the method in the manner described above.

Once the User Equipment (UE) 404 has collected the required timestamps (i.e. $\widetilde{T_{ijk}}, \widetilde{R_{ijk}}, \widetilde{T_{ijk}}, \widetilde{R_{jik}}$) the User Equipment (UE) 404 generates matrices A & b as shown above and solves the equation $\theta=bA^{-1}$, optionally using the least squares (LS) method, in order to obtain a solution for the values of $\theta$. Once the values of $\theta$ are known, the unknown clock skew, clock offset, and propagation delay are calculated according to the equations below where $\ominus$ denotes a matrix element wise division.

$$\tilde{\omega} = I \ominus \alpha = 1/\theta(1, 1)$$
$$\tilde{\phi} = -\beta \ominus \alpha = -\frac{\theta(1, 2)}{\theta(1, 1)}$$
$$\tilde{\tau} = \theta(1, 3)$$

These parameters are then used to update the clock at the User Equipment (UE) 404, thereby reducing the inaccuracies in timing synchronization caused by the clock offset and clock skew of the User Equipment (UE) 404.

Figure 7:
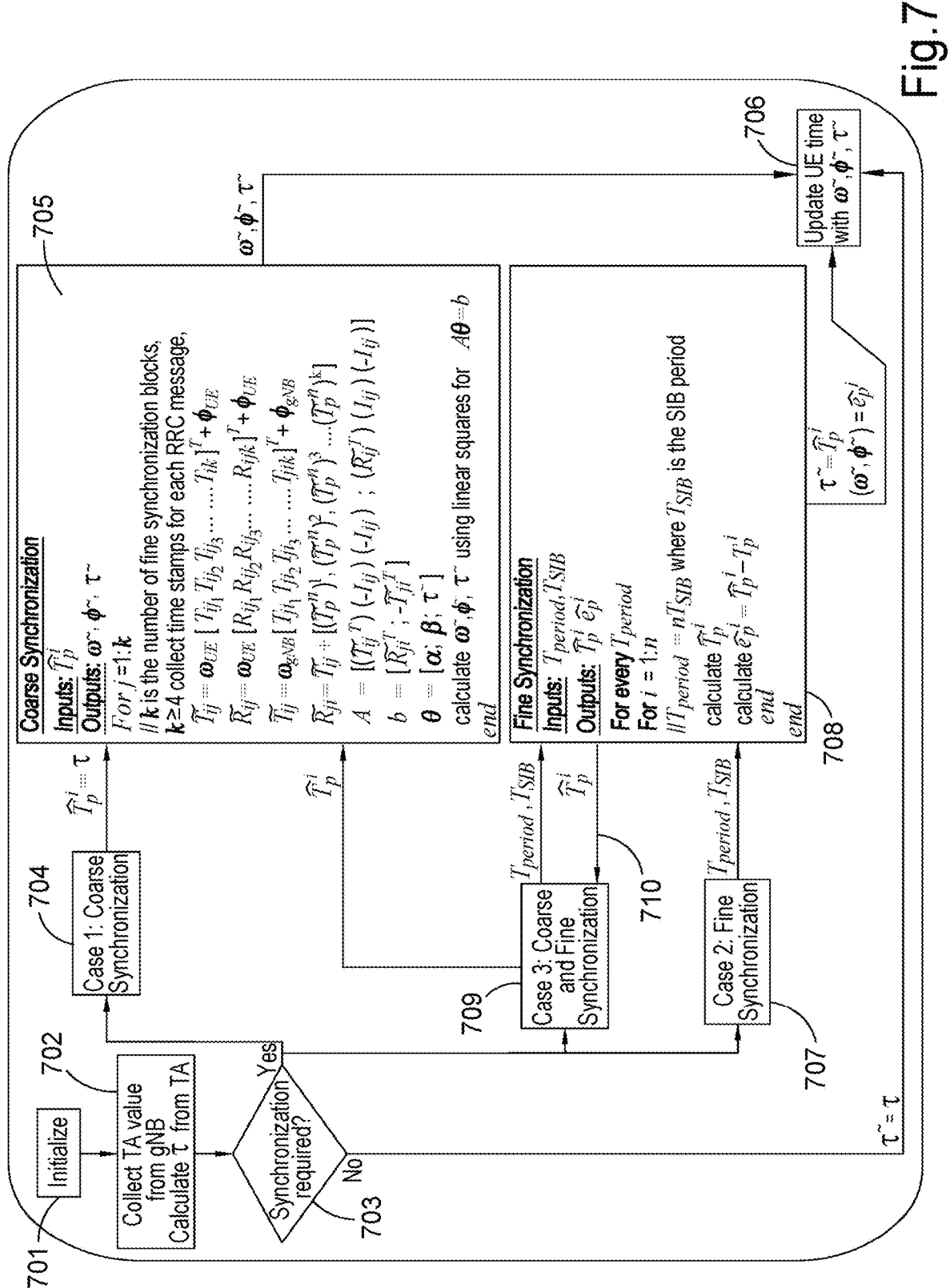
FIG. 7 shows a method of Time Sensitive Synchronization (TeSSa) according to an embodiment.

FIG. 7 shows a method of Time Sensitive Synchronization (TeSSa) according to an embodiment. In order to provide timing accuracy and time synchronization, a two-step approach of, firstly, receiving the timing information and periodically comparing to check the accuracy, and secondly, keeping track of the User Equipment's (UE) self-error to predict the inaccuracy and synchronisation error is provided.

The method begins in step 701 by the User Equipment (UE) 404 performing Initial Access (i.e. the process after the User Equipment (UE) 404 has been switched on and before the User Equipment (UE) 404 sends UE specific data to the gNodeB).

As discussed above, a Timing Advance (TA) is generated during the initial Random Access (RA) procedure when the gNodeB 403 estimates the propagation delay between the User Equipment (UE) 404 and the gNodeB 403. The gNodeB 403 subsequently transmits the Timing Advance (TA), with a granularity in milliseconds, to the User Equipment (UE) 404.

In step 702 the User Equipment (UE) 404 collects the timing advance (TA) value transmitted by the gNodeB and determines a propagation delay, r, based on the value of the timing advance (TA) and radio parameters of the wireless communication link (e.g. subcarrier spacing etc.).

In step 703 the method determines whether synchronization is required.

In an embodiment, whether synchronization is required and the level of synchronization (i.e. case 1, 2 or 3) is predetermined, optionally in a configuration file.

In a different embodiment the total end-to-end synchronisation error ($e_{total}$) is calculated as described above (using a propagation delay derived from the Timing Advance (TA)). This error is compared to a predetermined threshold. If the error is greater than the threshold then synchronization is required. If, on the other hand, the error is less than the threshold then synchronization is not required.

If synchronization is required, a predetermined level of synchronisation is performed. The method of Time Sensitive Synchronization (TeSSa) shown in FIG. 7 comprises three levels of synchronisation. In a first case 704, only coarse synchronisation is performed.

In the first case 704, the method sets the estimated propagation delay, $\widehat{T_p}^i$, equal to the propagation delay, $\tau$, derived from the timing advance (TA). When the first case 704 is selected coarse synchronisation is performed in step 705 according to the method described in relation to FIG. 6. The output of the course synchronization performed in step 705 is an estimated clock offset $\tilde{\phi}$, an estimated clock skew $\tilde{\omega}$, and an estimated propagation delay $\tilde{\tau}$.

In step 706 the User Equipment (UE) time is updated using the estimated clock offset $\tilde{\phi}$, the estimated clock skew $\tilde{\omega}$, and the estimated propagation delay $\tilde{\tau}$. In an embodiment these parameters are also stored and output if required.

In a second case 707 (i.e. in a second level of synchronization), only fine synchronization is performed. In the second case 707, the time period of an iteration, $T_{period}$, and the time period between periodic broadcasts of System Information Block (SIB) messages, $T_{SIB}$, are provided to the fine synchronisation method.

In an embodiment the time period between periodic broadcasts of System Information Block (SIB) messages, $T_{SIB}$, is predetermined (e.g. set according to the communication standard) and the time period of an iteration, $T_{period}$, is equal to $nT_{SIB}$, where n is a predetermined positive integer.

Fine synchronisation is performed in step 708 according to the method described in relation to FIG. 5. The output of the fine synchronisation in step 708 is an estimated propagation delay, $\widehat{T_p}^i$ and an error in the estimated propagation delay, $\widehat{e_p}^i$. As discussed above, the estimated propagation delay is calculated according to $\widehat{e_p}^i = \widehat{T_p}^i - T_p^i$, where $T_p^i$ is the propagation delay derived from the Timing Advance (TA). In the second case 707 the timing error due to combination of the estimated clock offset $\tilde{\phi}$ and the estimated clock skew $\tilde{\omega}$ is approximated to be equal to the error in the estimated propagation delay, $\widehat{e_p}^i$. Based on these values the User Equipment (UE) 404 time is updated in step 706.

In a third case 709 (i.e. in a third level of synchronization), both coarse synchronization and fine synchronization are performed. In the third case 709 fine synchronisation is performed first in order to determine an estimated propagation delay, $\widehat{T_p}^i$. This estimated propagation delay is then provided as inputs to the course synchronization block in order to determine an estimated clock offset r, an estimated clock skew $\tilde{\omega}$, and an estimated propagation delay $\tilde{\tau}$ for use in updating the timing of the User Equipment (UE).

As discussed above in relation to FIG. 5, in the fine synchronization step 708, the User Equipment (UE) 404 calculates the propagation delay by averaging individual measurements of the propagation delay; this has the effect of also averaging the errors in the propagation delay, thereby reducing the overall error. In an embodiment fine synchronisation is performed after a number (e.g. 1, 2, 3, etc.) of milliseconds. Fine synchronization as shown in FIG. 5 and FIG. 7 is a lightweight algorithm (i.e. it is computationally inexpensive) and can be used with existing communication standards (e.g. 5G New Radio (NR)) since existing physical layer System Information Block (SIB) beacons are used for calculating the Time of Arrival (TOA). This is advantageous since it removes the complexity associated with implementing hardware time stamping. Furthermore, by avoiding the need for hardware time stamping the synchronization algorithm can be implemented by a larger number of device types without the need for any modifications.

In an embodiment the coarse synchronisation step 705 is performed after a number (e.g. 1, 2, 3, etc.) of seconds to estimate the clock skew and the clock offset, both of which effect the timing accuracy. As discussed in relation to FIG. 6, during coarse synchronization the User Equipment (UE) receives timestamps with nano-second granularity via unicast RRC messages. Based on these messages, coarse synchronization uses algorithms such as the least squares method to estimate the timing errors at the User Equipment (UE). These timing errors are then be used to compensate the time values generated by the User Equipment (UE) during timing synchronisation By using the above-described method the User Equipment (UE) can estimate and pre-compensate for the propagation delay, fine-tune the indicated time reference, and reduce synchronization errors.

The method of Time Sensitive Synchronization (TeSSa) presented herein was simulated with a cell radius of 100 m, in which the gNodeB and the User Equipment (UE) were randomly located. An indoor microchannel model from "Kyösti, Pekka & Meinilä, Juha & Hentila, Lassi & Zhao, Xiongwen & Jämsä, Tommi & Schneider, Christian & Narandzi'c, M & Milojevi'c, M & Hong, A & Ylitalo, Juha & Holappa, Veli-Matti & Alatossava, M & Bultitude, R. J. C. & Jong, Yvo & Rautiainen, T. (2008). IST-4-027756 WINNER II D1.1.2 v1.2 WINNER II channel models. Inf. Soc. Technol. 11", which is included herein by reference, was used to simulate realistic conditions and errors in the wireless communication channel between the User Equipment (UE) and the gNodeB. The delay spread, Signal-to-Noise Ratio (SNR) and the distance values produced by the arrangement and the model were used to calculate the random and measurement time synchronization errors discussed in relation to FIG. 2.

Predetermined values for the various inaccuracies present within the Timing Advance (TA) value were used. These errors were added to the actual Time of Arrival value in order to model realistic errors and inaccuracies. A 30 parts-per-million (ppm) clock offset with a standard deviation of 1 µs clock jitter was used in the simulations.

Figure 8A:
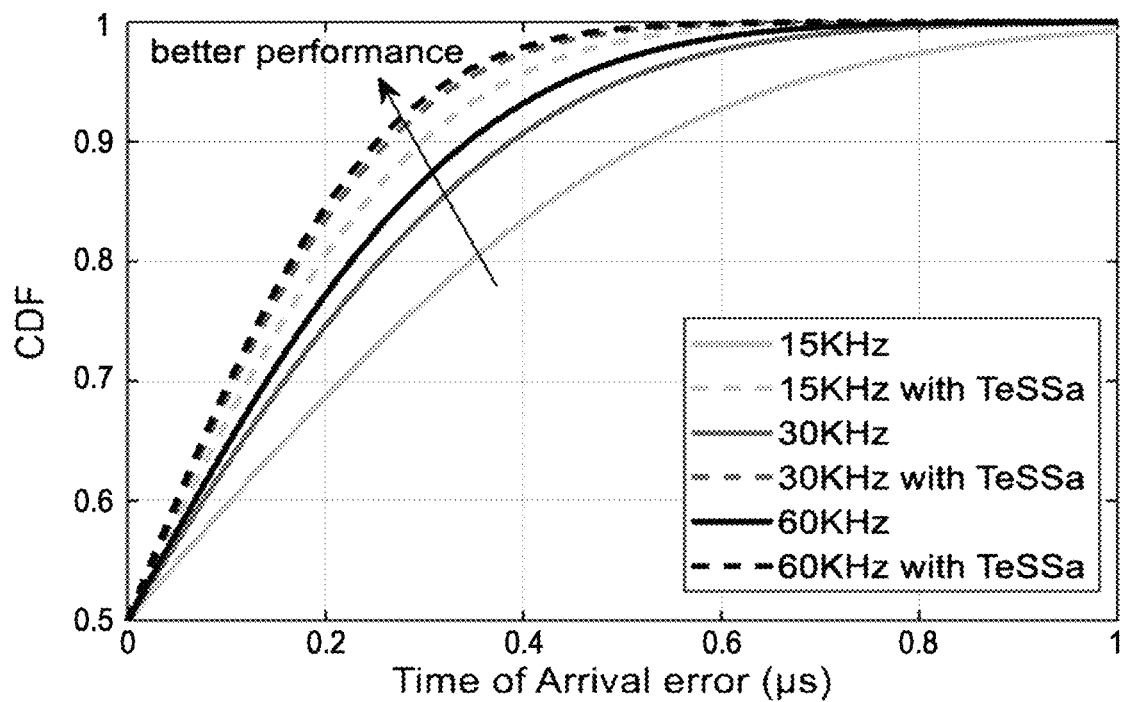
FIG. 8A shows the Time of Arrival (TOA) error for different subcarrier spacings according to an embodiment.

FIG. 8A shows the Time of Arrival (TOA) error for different subcarrier spacings according to an embodiment. FIG. 8A shows a comparison between the Time of Arrival (TOA) error where fine synchronization is and is not used. The Time of Arrival (TOA) error being the difference between the Time of Arrival (TOA) determined by the User Equipment (UE) and the actual Time of Arrival. The Time of Arrival, is equivalent to the propagation delay between the gNodeB and the User Equipment (UE).

The cumulative distribution function (CDF) curves in FIG. 8A show a reduction in timing errors from 10-40% depending upon the subcarrier spacing for systems that use Time Sensitive Synchronization (TeSSa). This is due, in part, to the averaging of consecutive Time Of Arrival (TOA) (or in other words, propagation delay) measurements in the fine synchronization algorithm. This averaging reduces the error caused by the Time Of Arrival (TOA) measurements that are assigned values to either side of the true Time Of Arrival (TOA).

Figure 8B:
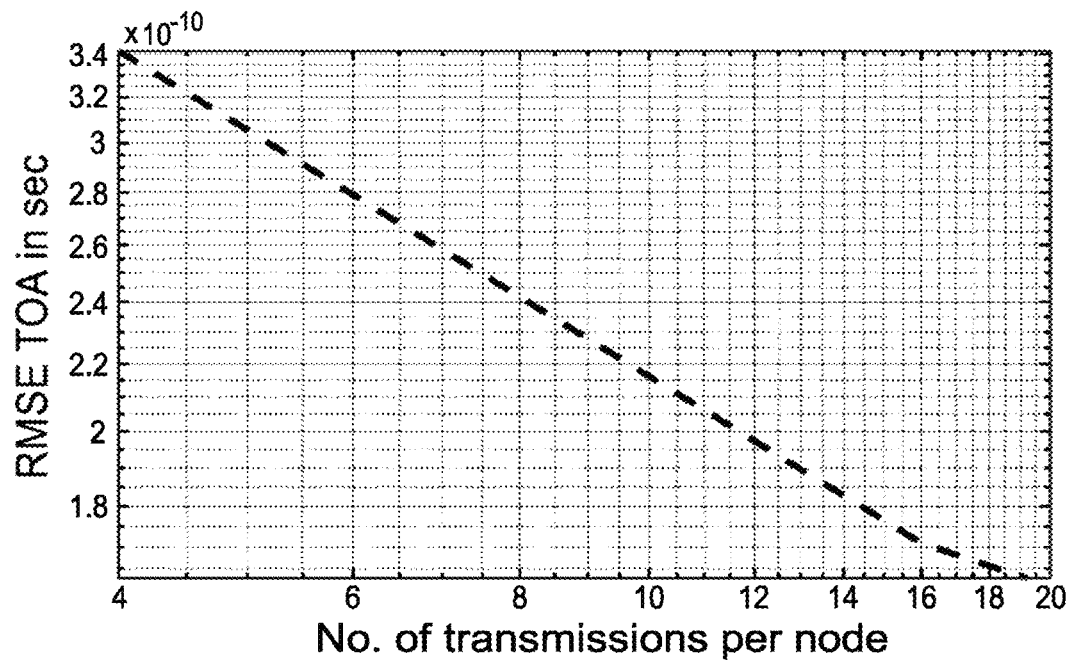
FIG. 8B shows the root mean square error (RMSE) in the Time of Arrival when using Time Sensitive Synchronization (TeSSa) according to an embodiment.

FIG. 8B shows the root mean square error (RMSE) in the Time of Arrival when using Time Sensitive Synchronization (TeSSa) according to an embodiment. FIG. 8B shows the root mean square error (RMSE) in the Time of Arrival reducing as the number of transmissions per node increases.

Figure 8C:
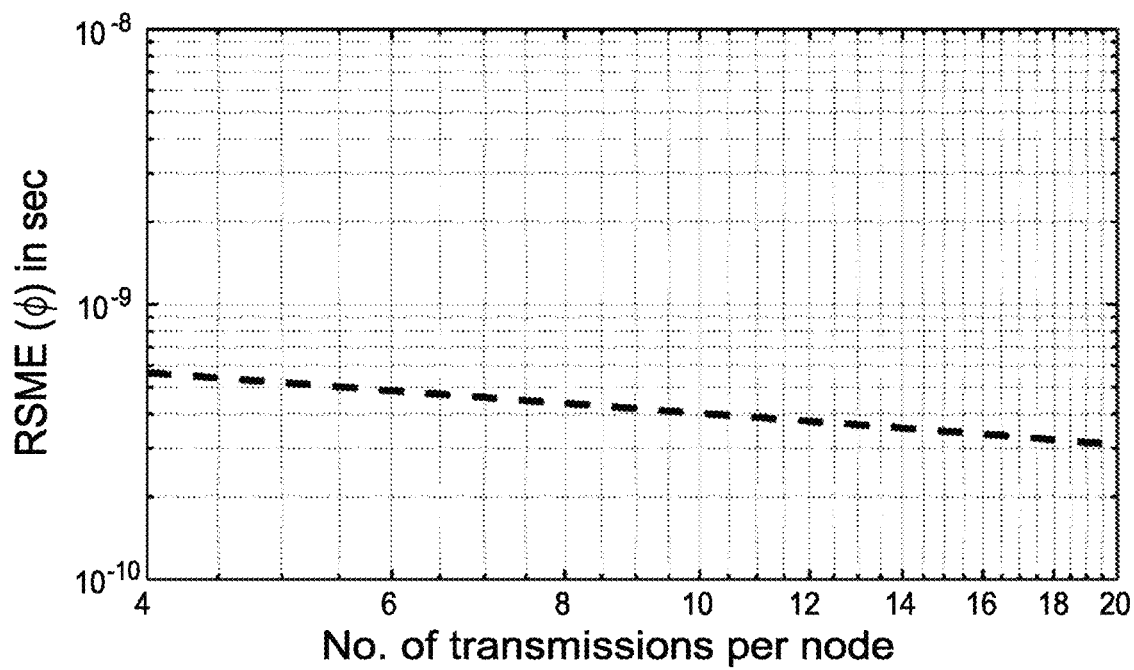
FIG. 8C shows the root mean square error (RMSE) in the clock skew when using Time Sensitive Synchronization (TeSSa) according to an embodiment.

FIG. 8C shows the root mean square error (RMSE) in the clock skew when using Time Sensitive Synchronization (TeSSa) according to an embodiment. FIG. 8C shows the root mean square error (RMSE) in the clock skew reducing as the number of transmissions per node increases.

Figure 8D:
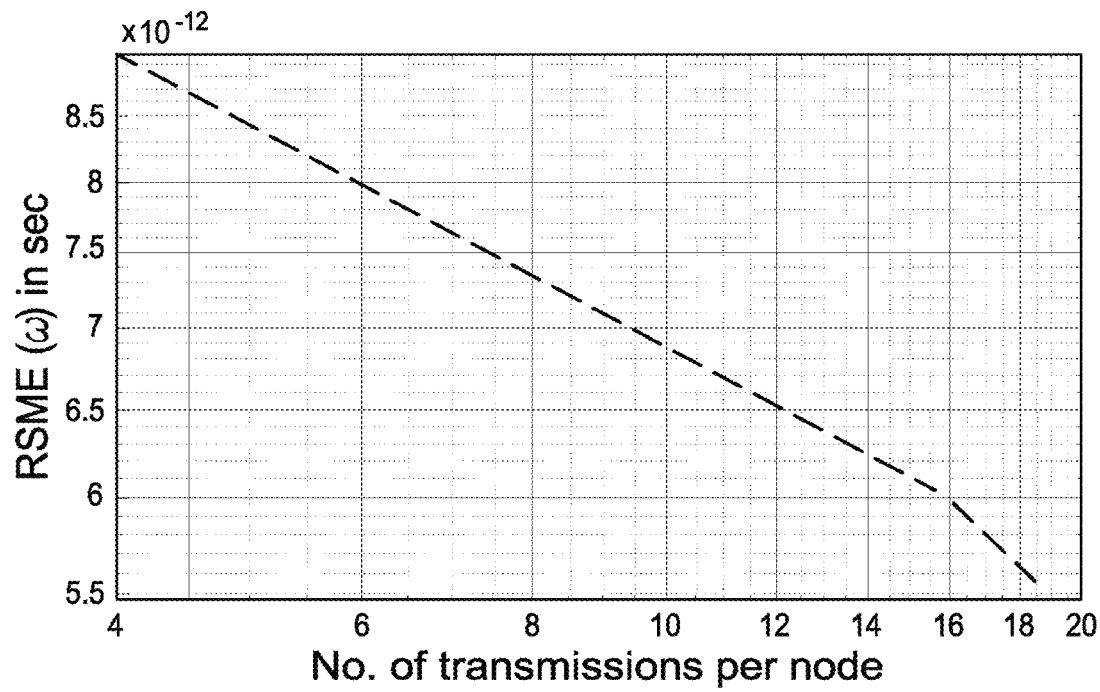
FIG. 8D shows the root mean square error (RMSE) in the clock offset when using Time Sensitive Synchronization (TeSSa) according to an embodiment.

FIG. 8D shows the root mean square error (RMSE) in the clock offset when using Time Sensitive Synchronization (TeSSa) according to an embodiment. FIG. 8D shows the root mean square error (RMSE) in the clock offset reducing as the number of transmissions per node increases.

Each of FIGS. 8A, 8B, 8C, and 8D shows that the method of Time Sensitive Synchronization (TeSSa) presented herein reduces the various errors to less than a few nanoseconds and that these errors reduce further with an increasing number of iterations.

By reducing the timing synchronisation errors the method of Time Sensitive Synchronization (TeSSa) presented herein enables the wireless communication system to satisfy the maximum timing synchronization error for Time Sensitive Communication (TSC) of 1 µs.

Time Sensitive Synchronization (TeSSa) provides nano-second level timing accuracy improvements for asynchronous traffic over 5G networks, reduces local time inaccuracy due to clock skew and clock offset, and keeps track of the node's self-error to predict the inaccuracy and synchronization error.

Figure 9A:
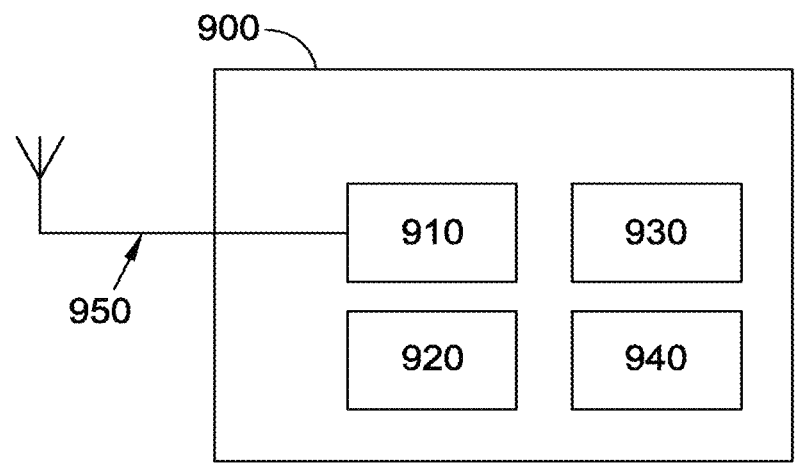
FIG. 9A shows a User Equipment (UE) device according to an embodiment.

FIG. 9A shows a User Equipment (UE) device according to an embodiment. The User Equipment (UE) device 900 comprises an input/output module 910, a processor 920 and a non-volatile memory 930. The input/output module 910 is communicatively connected to an antenna 950. The antenna 950 is configured to receive signals from, and transmit signals to, a gNodeB (i.e a base station). The processor 920 is coupled to the input/output module 910 and to the non-volatile memory 930. The non-volatile memory 930 stores computer program instructions that, when executed, cause the processor 920 to execute program steps that implement the method of Time Sensitive Synchronization (TeSSa) described herein.

In an embodiment, the User Equipment (UE) device 900 comprises a Time Sensitive Network (TSN) interface 940. The Time Sensitive Network (TSN) interface 940 enables the User Equipment (UE) 900 to communicate with a Time Sensitive Network (TSN). Optionally, the Time Sensitive Network (TSN) interface 940 receives and/or transmits Time Sensitive Network (TSN) time values to and/or from the Time Sensitive network (TSN). In an embodiment the Time Sensitive Network (TSN) interface 940 comprises a translator as discussed in relation to FIG. 3.

In one embodiment the Time Sensitive Network (TSN) interface 940 is connected to an actuator and/or sensor for use in monitoring and controlling an industrial process. The sensor and/or actuator node may be configured to perform any number of functions including, but not limited to, quality control, predictive machinery maintenance and factory safety.

Whilst in the embodiment described above the antenna 950 is shown to be situated outside of, but connected to, the device 900 it will be appreciated that in other embodiments the antenna 950 forms part of the device 900. Furthermore, although in FIG. 9A only a single antenna 950 is shown it is emphasized that the input/output module 910 may comprise a plurality of antennas.

Other uses outside of an industrial process are of course also possible. In fact, the methods and devices that are described herein can relate generally to any wireless network where time synchronization is required.

Figure 9B:
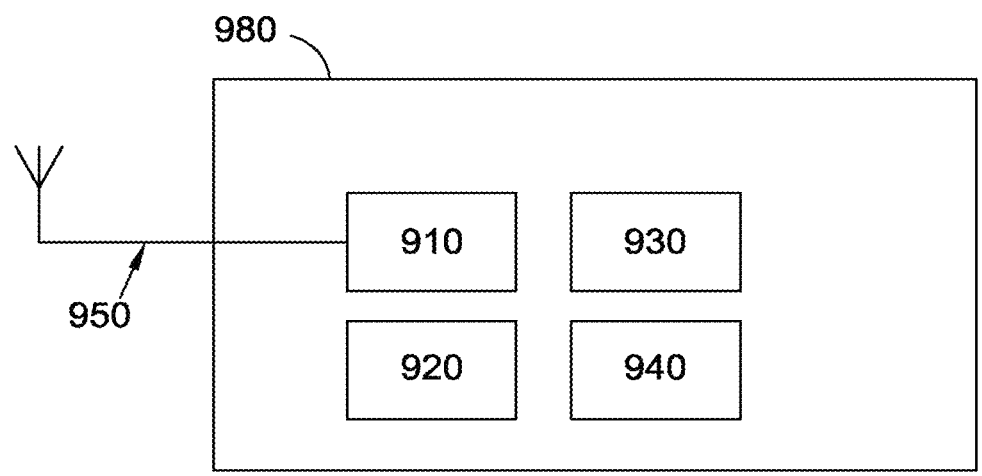
FIG. 9B shows a gNodeB according to an embodiment.

FIG. 9B shows a gNodeB according to an embodiment. FIG. 9B shows a gNodeB 980 comprising similar components to the User Equipment (UE) 900. As a result a detailed description of the repeated components will be omitted. In an embodiment the Time Sensitive Network (TSN) interface

940 of the gNodeB 980 comprises a User Plane Function (UPF). The gNodeB 980 maintains the 5G reference time (i.e. the 5G grand master (GM) clock). In an embodiment (not shown), the gNodeB 980 is connected to an external time source.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computer-implemented method for determining time synchronisation parameters of a communication apparatus in a wireless network, the method comprising:
    transmitting an uplink message at a first time, the first time being the start of a time period ($T_{period}$);
    receiving at least one downlink message, each downlink message being associated with a first round trip delay ($T_{roundAi}$), a second round trip delay ($T_{roundB(n+1-i)}$), a first reply time ($T_{replyA(n+1-i)}$) and a second reply time ($T_{replyB1}$) wherein;
        the first round trip delay ($T_{roundAi}$) equals a time difference between transmitting the uplink message and receiving a downlink message;
        the first reply time ($T_{replyA(n+1-i)}$) equals a difference between the time period ($T_{period}$) and the first round trip delay ($T_{roundAi}$);
        the second reply time ($T_{replyB1}$) equals a time difference between a second communication apparatus receiving the uplink message and transmitting the downlink message; and
        the second round trip time ($T_{roundB(n+1-i)}$) equals a difference between the time period ($T_{period}$) and the second reply time ($T_{replyB1}$);
    determining a first difference between the first round trip delay ($T_{roundAi}$) and the first reply time ($T_{replyA(n+1-i)}$);
    determining a second difference between the second round trip time ($T_{roundB(n+1-i)}$) and the second reply time ($T_{replyB1}$); and
    calculating an estimated propagation delay ($\widehat{T_p}^i$) based on the sum of the first difference ($T_{roundAi} - T_{replyA(n+1-i)}$) and the second difference ($T_{roundB(n+1-i)} - T_{replyBi}$).

2. The computer-implemented method according to claim 1 wherein calculating the estimated propagation delay further comprises dividing the sum of the first difference and the second difference by four.

3. The computer-implemented method according to claim 2 wherein the at least one downlink message comprises a first downlink message and a second downlink message, and wherein calculating an estimated propagation delay comprises:
    averaging:
        the sum of the first difference and the second difference associated with the first downlink message; and
        the sum of the first difference and the second difference associated with the second downlink message.

4. The computer-implemented method according to claim 3 wherein the method further comprises:
    receiving a second reply time associated with the first downlink message ($T_{replyB1}$) from the second communication apparatus; and
    calculating a second reply time associated with the second downlink message ($T_{replyB2}$) based on the second reply time associated with the first downlink message ($T_{replyB1}$).

5. The computer-implemented method according to claim 4 wherein a duration of time between the second communication apparatus transmitting the first downlink message and the second communication apparatus transmitting the second downlink message equals a first delay ($T_{SIB}$), and wherein:
    calculating the second reply time associated with the second downlink message ($T_{replyB2}$) comprises adding the first delay ($T_{SIB}$) to the second reply time associated with the first downlink message ($T_{replyB1}$).

6. The computer-implemented method according to claim 5 further comprising:
    measuring a time delay ($\Delta$) between receiving the first downlink message and receiving the second downlink message;
    determining an offset ($SIB_{offset}$) based on the time delay ($\Delta$); and
    calculating a first round trip time associated with the second downlink message ($T_{roundA2}$) by summing the time offset ($SIB_{offset}$), the first delay ($T_{SIB}$) and a first round trip time associated with the first downlink message ($T_{roundA1}$).

7. The computer-implemented method according to claim 6 further comprising:
    determining the first round trip time associated with the first downlink message ($T_{roundA1}$) by measuring a time difference between transmitting the first uplink message and receiving the first downlink message.

8. The computer-implemented method according to claim 7 further comprising:
    determining an error in the estimated propagation delay ($\widehat{e_p}^i$) according to a difference between the estimated propagation delay ($\widehat{T_p}^i$) and a propagation delay derived from a Timing Advance (TA).

9. A computer-implemented method for determining time synchronisation parameters of a communication apparatus in a wireless network, the method comprising:
    performing at least one iteration, each iteration comprising:
        determining an estimated propagation delay (($\widehat{T_p}^n)^k; \tau$) for a communication link between the communication apparatus and a second apparatus;
        transmitting an uplink message at a first time ($\widetilde{T_{ijk}}$);
        receiving a response to the uplink message at a second time ($\widetilde{R_{ijk}}$);
        determining a third time ($\widetilde{R_{jik}}$) based on the sum of the first time ($\widetilde{T_{ijk}}$) and the estimated propagation delay (($\widehat{T_p}^n)^k; \tau$);
        determining a fourth time ($\widetilde{T_{ijk}}$) indicating a time of transmission of the response to the uplink message; and
        determining a clock skew ($\omega^{\sim}$) and a clock offset ($\phi^{\sim}$) for the communication apparatus and a propagation delay for the communication link ($\tau^{\sim}$), based on: the first time ($\widetilde{T_{ijk}}$), the second time ($\widetilde{R_{ijk}}$), the third time ($\widetilde{R_{jik}}$), and the fourth time ($\widetilde{T_{ijk}}$).

10. The computer-implemented method according to claim 9 wherein determining the clock skew ($\omega^\sim$) and the clock offset ($\phi^\sim$) for the communication apparatus, and the propagation delay for the communication link ($\tau^\sim$) comprises:

forming a first matrix (A) comprising the first time ($\widetilde{T_{ijk}}$) and the second time ($\widetilde{R_{ijk}}$);

forming a second matrix (b) comprising the third time ($\widetilde{R_{jik}}$) and the fourth time ($\widetilde{T_{ijk}}$);

forming a third matrix ($\theta$) comprising a plurality of synchronization parameters ($\alpha$; $\beta$) and the propagation delay for the communication link ($\tau^\sim$); and determining a value for the third matrix ($\theta$) that equals the second matrix (b) multiplied by an inverse of the first matrix ($A^{-1}$).

11. The computer-implemented method according claim 10 wherein the at least one iteration equals four iterations.

12. The computer-implemented method according to claim 11 wherein determining the fourth time ($\widetilde{T_{ijk}}$) comprises receiving the fourth time ($\widetilde{T_{ijk}}$) in the response to the uplink message.

13. The computer-implemented method according to claim 12 wherein the method further comprises:

updating a local time reference of the communication apparatus using the calculated propagation delay ($\tau^\sim$), the calculated clock offset ($\phi^\sim$), and the calculated clock skew ($\omega^\sim$).

14. The computer-implemented method according to claim 9 wherein:

the first time is the start of a time period ($T_{period}$); and determining the estimated propagation delay (($\widehat{T_p}^n$)) comprises:

receiving at least one downlink message, each downlink message being associated with a first round trip delay ($T_{roundAi}$), a second round trip delay ($T_{roundB(n+1-i)}$), a first reply time ($T_{replyA(n+1-i)}$) and a second reply time ($T_{replyB1}$) wherein;

the first round trip delay ($T_{roundAi}$) equals a time difference between transmitting the uplink message and receiving a downlink message;

the first reply time ($T_{replyA(n+1-i)}$) equals a difference between the time period ($T_{period}$) and the first round trip delay ($T_{roundAi}$);

the second reply time ($T_{replyB1}$) equals a time difference between a second communication apparatus receiving the uplink message and transmitting the downlink message; and the second round trip time ($T_{roundB(n+1-i)}$) equals a difference between the time period ($T_{period}$) and the second reply time ($T_{replyB1}$):

determining a first difference between the first round trip delay ($T_{roundAi}$) and the first reply time ($T_{replyA(n+1-i)}$);

determining a second difference between the second round trip time ($T_{roundB(n+1-i)}$) and the second reply time ($T_{replyB1}$); and calculating the estimated propagation delay ($\widehat{T_p}^i$) based on the sum of the first difference ($T_{roundAi} - T_{replyA(n+1-i)}$) and the second difference ($T_{roundB(n+1-i)} - T_{replyBi}$).

15. The computer-implemented method according to claim 9 wherein the estimated propagation delay ($\tau$) is determined based on a Timing Advance (TA) value.

16. A computer-implemented method for determining time synchronisation parameters of a communication apparatus in a wireless network, the method comprising:

receiving a Timing Advance (TA) from a second communication apparatus;

determining a first propagation delay ($\tau$) from the Timing Advance (TA);

determining an error ($e_{total}$) in the first propagation delay ($\tau$);

comparing the error ($e_{total}$) with a predetermined threshold; and in response to determining that the error ($e_{total}$) is greater than the predetermined threshold:

determining a propagation delay ($\tau^\sim$) using the method of claim 9; and updating a local time reference of the communication apparatus using the propagation delay ($\tau^\sim$).

17. The computer-implemented method of claim 16 wherein the method further comprises:

calculating a clock skew ($\omega^\sim$) and a clock offset ($\phi^\sim$) for the communication apparatus; and updating the local time reference of the communication apparatus using the clock skew ($\omega^\sim$) and a clock offset ($\phi^\sim$).

18. A computer-implemented method for determining time synchronisation parameters of a communication apparatus in a wireless network, the method comprising:

receiving a Timing Advance (TA) from a second communication apparatus;

determining a first propagation delay ($\tau$) from the Timing Advance (TA);

determining an error ($e_{total}$) in the first propagation delay ($\tau$);

comparing the error ($e_{total}$) with a predetermined threshold; and in response to determining that the error ($e_{total}$) is greater than the predetermined threshold:

calculating an estimated propagation delay ($\widehat{T_p}^i$) using the method of claim 1; and updating a local time reference of the communication apparatus using the estimated propagation delay ($\widehat{T_p}^i$).

19. The computer-implemented method of claim 18 wherein the method further comprises:

calculating an error in the estimated propagation delay ($\widehat{e_p}^i$) according to a difference between the estimated propagation delay ($\widehat{T_p}^i$) and the propagation delay ($\tau$); and updating the local time reference of the communication apparatus using the error in the estimated propagation delay ($\widehat{e_p}^i$).

20. A device for determining time synchronisation parameters of a communication apparatus in a wireless network, the device being configured to:

receive a Timing Advance (TA) from a second communication apparatus;

determine a first propagation delay ($\tau$) from the Timing Advance (TA);

determine an error ($e_{total}$) in the first propagation delay ($\tau$);

compare the error ($e_{total}$) with a predetermined threshold; and in response to determining that the error ($e_{total}$) is greater than the predetermined threshold:
  determine a propagation delay ($\tilde{\tau}$) using the method of claim 9; and
  update a local time reference of the communication apparatus using the propagation delay ($\tilde{\tau}$).

\* \* \* \* \*